United States Patent
Johnson et al.

(10) Patent No.: US 9,399,320 B2
(45) Date of Patent: Jul. 26, 2016

(54) THREE-DIMENSIONAL PARTS HAVING INTERCONNECTED HOLLOW PATTERNS, AND METHOD FOR GENERATING AND PRINTING THEREOF

(71) Applicant: Stratasys, Inc., Eden Prairie, MN (US)

(72) Inventors: Kevin C. Johnson, Minneapolis, MN (US); William J. Swanson, St. Paul, MN (US)

(73) Assignee: Stratasys, Inc., Eden Prairie, MN (US)

(*) Notice: Subject to any disclaimer, the term of this patent is extended or adjusted under 35 U.S.C. 154(b) by 531 days.

(21) Appl. No.: 13/790,849

(22) Filed: Mar. 8, 2013

(65) Prior Publication Data

US 2014/0255647 A1 Sep. 11, 2014

(51) Int. Cl.
*B32B 3/00* (2006.01)
*B29C 67/00* (2006.01)
*B33Y 10/00* (2015.01)
*B33Y 80/00* (2015.01)
*B32B 3/12* (2006.01)

(52) U.S. Cl.
CPC .............. *B29C 67/00* (2013.01); *B29C 67/0051* (2013.01); *B29C 67/0059* (2013.01); *B29C 67/0092* (2013.01); *B32B 3/12* (2013.01); *B33Y 10/00* (2014.12); *B33Y 80/00* (2014.12); *Y10T 428/24149* (2015.01); *Y10T 428/24165* (2015.01)

(58) Field of Classification Search
None
See application file for complete search history.

(56) References Cited

U.S. PATENT DOCUMENTS

| | | | |
|---|---|---|---|
| 5,121,329 A | 6/1992 | Crump | 364/468 |
| 5,169,081 A | 12/1992 | Goedderz | 242/54 |
| 5,303,141 A | 4/1994 | Batchelder et al. | 364/149 |
| 5,312,224 A | 5/1994 | Batchelder et al. | 415/73 |
| 5,340,433 A | 8/1994 | Crump | 156/578 |
| 5,503,785 A | 4/1996 | Crump et al. | 264/40.7 |
| 5,738,817 A | 4/1998 | Danforth et al. | 264/603 |
| 5,764,521 A | 6/1998 | Batchelder et al. | 364/475.01 |
| 5,866,058 A | 2/1999 | Batchelder et al. | 264/237 |
| 5,900,207 A | 5/1999 | Danforth et al. | 264/603 |
| 5,939,008 A | 8/1999 | Comb et al. | 264/308 |
| 5,968,561 A | 10/1999 | Batchelder et al. | 425/375 |
| 6,004,124 A | 12/1999 | Swanson et al. | 425/375 |
| 6,022,207 A | 2/2000 | Dahlin et al. | 425/145 |
| 6,054,077 A | 4/2000 | Comb et al. | 264/40.7 |
| 6,067,480 A | 5/2000 | Stuffle et al. | 700/109 |
| 6,070,107 A | 5/2000 | Lombardi et al. | 700/119 |
| 6,085,957 A | 7/2000 | Zinniel et al. | 226/8 |
| 6,129,872 A | 10/2000 | Jang | 264/75 |
| 6,228,923 B1 | 5/2001 | Lombardi et al. | 524/425 |
| 6,257,517 B1 | 7/2001 | Babish et al. | 242/365.6 |
| 6,277,340 B1* | 8/2001 | Paikert | B01J 19/32 422/211 |
| 6,547,995 B1 | 4/2003 | Comb | 264/40.1 |

(Continued)

*Primary Examiner* — David Sample
*Assistant Examiner* — Nicholas W Jordan
(74) *Attorney, Agent, or Firm* — Westman, Champlin & Koehler, P.A.

(57) ABSTRACT

A three-dimensional part printed using an additive manufacturing technique, which includes sets of printed cell layers, each defining an array of hollow cells with wall segments, and sets of printed transition layers, each being disposed between adjacent printed cell layers, where the sets of printed transition layers each comprise sloped walls that diverge from a first portion of the wall segments and that converge towards a second portion of the wall segments to interconnect the hollow cells of adjacent printed cell layers, and where the sloped walls of adjacent printed transition layers have printing orientations that are rotated from each other in a build plane.

20 Claims, 32 Drawing Sheets

(56) References Cited

U.S. PATENT DOCUMENTS

| | | | |
|---|---|---|---|
| 6,645,412 B2 | 11/2003 | Priedeman, Jr. | 264/219 |
| 6,685,866 B2 | 2/2004 | Swanson et al. | 264/308 |
| 6,722,872 B1 | 4/2004 | Swanson et al. | 425/225 |
| 6,730,252 B1 | 5/2004 | Teoh et al. | 264/178 |
| 6,749,414 B1 | 6/2004 | Hanson et al. | 425/130 |
| 6,790,403 B1 | 9/2004 | Priedeman, Jr. et al. | 264/442 |
| 6,814,907 B1 | 11/2004 | Comb | 264/40.07 |
| 6,869,559 B2 | 3/2005 | Hopkins | 264/489 |
| 6,923,634 B2 | 8/2005 | Swanson et al. | 425/169 |
| 6,998,087 B1 | 2/2006 | Hanson et al. | 264/308 |
| 7,122,246 B2 | 10/2006 | Comb et al. | 428/364 |
| 7,127,309 B2 | 10/2006 | Dunn et al. | 700/98 |
| 7,172,715 B2 | 2/2007 | Swanson et al. | 264/39 |
| 7,236,166 B2 | 6/2007 | Zinniel et al. | 345/419 |
| 7,384,255 B2 | 6/2008 | LaBossiere et al. | 425/190 |
| 7,604,470 B2 | 10/2009 | LaBossiere et al. | 425/131.1 |
| 7,625,200 B2 | 12/2009 | Leavitt | 425/375 |
| 7,896,209 B2 | 3/2011 | Batchelder et al. | 26/53 |
| 7,938,351 B2 | 5/2011 | Taatjes et al. | 242/171 |
| 7,938,356 B2 | 5/2011 | Taatjes et al. | 242/580 |
| 7,951,324 B2 | 5/2011 | Naruse et al. | |
| 8,033,811 B2 | 10/2011 | Swanson et al. | 425/375 |
| 8,153,182 B2 | 4/2012 | Comb et al. | 427/8 |
| 8,221,669 B2 | 7/2012 | Batchelder et al. | 264/308 |
| 2002/0141912 A1* | 10/2002 | Murrell | B01D 53/8631 422/177 |
| 2005/0129941 A1 | 6/2005 | Comb et al. | 428/364 |
| 2007/0003656 A1 | 1/2007 | LaBossiere et al. | 425/375 |
| 2007/0228590 A1 | 10/2007 | LaBossiere et al. | 264/40.1 |
| 2009/0035405 A1 | 2/2009 | Leavitt | 425/97 |
| 2009/0263582 A1 | 10/2009 | Batchelder | 427/256 |
| 2009/0273122 A1 | 11/2009 | Batchelder et al. | 264/401 |
| 2009/0274540 A1 | 11/2009 | Batchelder et al. | 414/431 |
| 2010/0096072 A1 | 4/2010 | Hopkins et al. | 156/155 |
| 2010/0096485 A1 | 4/2010 | Taatjes et al. | 242/171 |
| 2010/0096489 A1 | 4/2010 | Taatjes et al. | 242/520 |
| 2010/0100224 A1 | 4/2010 | Comb et al. | 700/118 |
| 2010/0283172 A1 | 11/2010 | Swanson | 264/80 |
| 2010/0327479 A1 | 12/2010 | Zinniel et al. | 264/172.14 |
| 2011/0074065 A1 | 3/2011 | Batchelder et al. | 264/308 |
| 2011/0076495 A1 | 3/2011 | Batchelder et al. | 428/369 |
| 2011/0076496 A1 | 3/2011 | Batchelder et al. | 428/373 |
| 2011/0117268 A1 | 5/2011 | Batchelder et al. | 427/8 |
| 2011/0121476 A1 | 5/2011 | Batchelder et al. | 264/40.1 |
| 2011/0233804 A1 | 9/2011 | Batchelder et al. | 264/40.4 |
| 2012/0067501 A1 | 3/2012 | Lyons | 156/64 |
| 2012/0068378 A1 | 3/2012 | Swanson et al. | 264/308 |
| 2012/0070523 A1 | 3/2012 | Swanson et al. | 425/96 |
| 2012/0162314 A1 | 6/2012 | Swanson et al. | 347/37 |
| 2012/0164256 A1 | 6/2012 | Swanson et al. | 425/162 |
| 2013/0078073 A1 | 3/2013 | Comb et al. | 414/749.1 |

\* cited by examiner

THREE-DIMENSIONAL PARTS HAVING INTERCONNECTED HOLLOW PATTERNS, AND METHOD FOR GENERATING AND PRINTING THEREOF

BACKGROUND

The present disclosure relates to additive manufacturing systems for printing or otherwise building three-dimensional (3D) parts with layer-based, additive manufacturing techniques. In particular, the present disclosure relates to 3D parts having hollow geometries, and to methods for generating and printing such 3D parts.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, powder/binder jetting, electron-beam melting, and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a substrate in an x-y plane. The extruded part material fuses to previously deposited part material, and solidifies upon a drop in temperature. The position of the print head relative to the substrate is then incremented along a z-axis (perpendicular to the x-y plane), and the process is then repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited from a second nozzle pursuant to the generated geometry during the printing process. The support material adheres to the part material during fabrication, and is removable from the completed 3D part when the printing process is complete.

SUMMARY

An aspect of the present disclosure is directed to a 3D part printed using an additive manufacturing technique. The 3D part includes sets of printed cell layers, each defining an array of hollow cells with wall segments (e.g., honeycomb cells). The 3D part also includes a sets of printed transition layers, each being disposed between adjacent printed cell layers. The sets of printed transition layers each include sloped walls that diverge from a first portion of the wall segments and that converge towards a second portion of the wall segments to interconnect the hollow cells of adjacent printed cell layers in a manner that allows a fluid to flow through a plurality of the hollow cells. The sloped walls of adjacent printed transition layers also have printing orientations that are rotated from each other in a build plane (e.g., in an x-y build plane).

Another aspect of the present disclosure is directed to a 3D part printed using an additive manufacturing technique, where the 3D part includes a first set of printed cell layers defining a first array of hollow cells (e.g., honeycomb cells), where at least a first hollow cell of the first array has a first wall segment, and a second wall segment that is opposite of the first wall segment across the first hollow cell (e.g., opposing walls of a honeycomb cell). The 3D part also includes a first set of printed transition layers that define a third wall segment extending upwardly along a layer-printing direction from the first wall segment, and a sloped wall extending at an upward angle from the second wall segment, wherein the sloped wall converges with the third wall segment.

Another aspect of the present disclosure is directed to a method for generating and printing a three-dimensional part having an interconnected hollow pattern. The method includes printing a first set of cell layers using an additive manufacturing technique, wherein the first set of printed cell layers defines a first array of hollow cells with wall segments (e.g., honeycomb cells). The method also includes printing a first set of transition layers over the first set of printed cell layers using the additive manufacturing technique, where such printing steps include printing additional wall segments over first portions of the wall segments of the first array, printing sloped walls that diverge from second portions of the abutting wall segments, and that converge towards the printed additional wall segments. The method also includes printing a second set of cell layers over the first set of printed transition layers using the additive manufacturing technique, where the second set of printed cell layers defines a second array of hollow cells with wall segments, and where the first set of printed transition layers interconnects the hollow cells of the first array with the hollow cells of the second array.

DEFINITIONS

Unless otherwise specified, the following terms as used herein have the meanings provided below:

The terms "three-dimensional part" and "3D part" refer to 3D objects printed using an additive manufacturing technique, and may refer to parts printed from part or modeling materials, as well as support structures printed from support materials.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

DETAILED DESCRIPTION

The present disclosure is directed to a printed 3D part having an interconnected hollow pattern that includes (i) "cell layers" that each define an array of hollow cells (e.g., hollow honeycomb cells) with abutting wall segments, and (ii) "transition layers" disposed between adjacent cell layers along a layer-printing direction. As discussed below, the transition layers preferably interconnect the cell layers such that a fluid may flow into and through multiple hollow cells in the 3D part, more preferably into each hollow cell in the 3D part, regardless of the overall part geometry. In addition, the interconnected hollow pattern gives the 3D part good strength to reduce the risk of crushing or breaking during use, while also reducing the overall weight of the 3D part.

Figure 1:
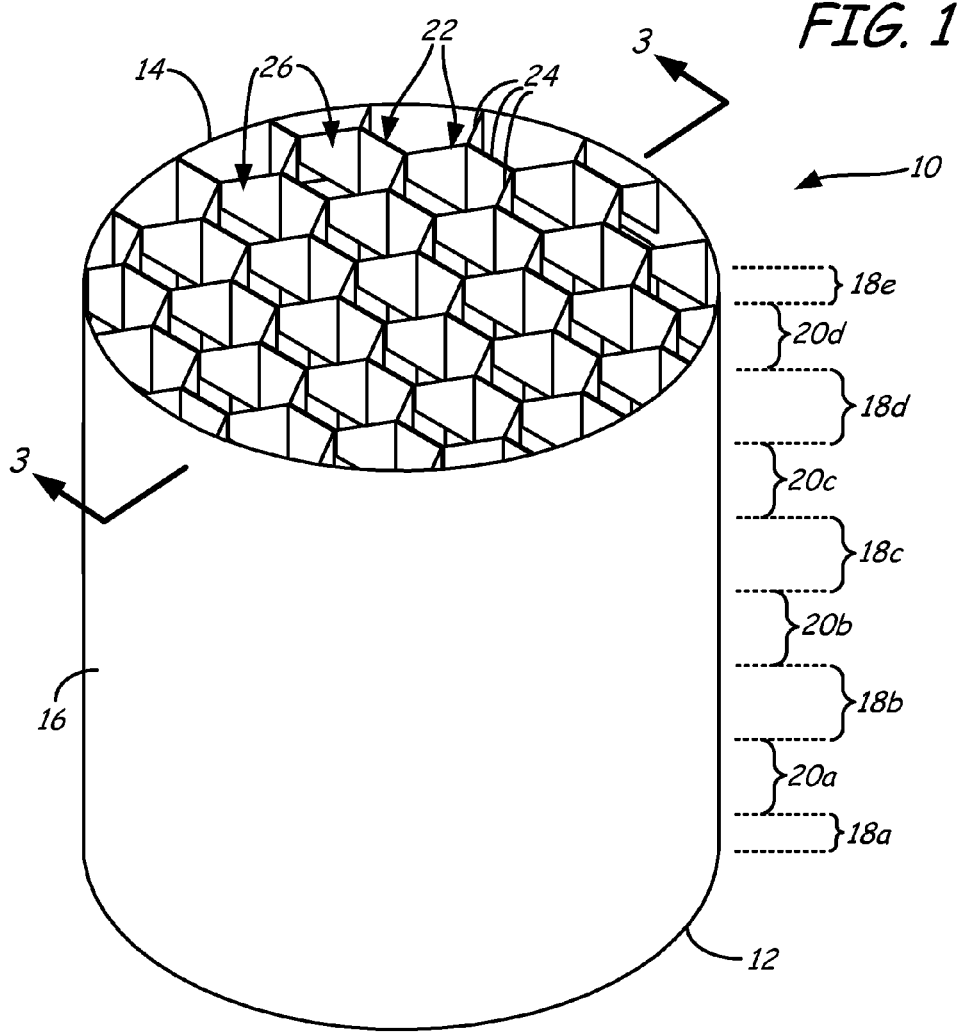
FIG. 1 is an isometric view of a 3D part of the present disclosure having an interconnected hollow pattern with honeycomb cell geometries.

As shown in FIG. 1, 3D part 10 is an example printed 3D part of the present disclosure having an interconnected hollow pattern. In the shown embodiment, 3D part 10 is printed with multiple successive layers each extending in a horizontal x-y plane, and are stacked along the z-axis. However, as defined above, x-y-z coordinate system may vary in orientation depending on the layer-printing direction, and may alternatively be based on different coordinate systems (e.g., polar coordinate systems). In the current example, 3D part 10 has a first or bottom layer 12 and a last or top layer 14, where the printed layers define perimeter wall 16 with a cylindrical overall geometry.

The printed layers of 3D part 10 between and including bottom layer 12 and top layer 14 are grouped into cell layers 18 (i.e., cell layers 18a-18e) and transition layers 20 (i.e., transition layers 20a-20d), where each set of transition layers 20 is preferably located between adjacent sets of cell layers 18 along the z-axis. Each set of cell layers 18 and transition layers 20 may be derived from any desired number of printed layers (e.g., 10-100 layers per set). In the shown embodiment, each set of cell layers 18 defines an array of honeycomb cells 22 located within the roads of perimeter wall 16. Each honeycomb cell 22 has a hexagon-shaped geometry defined by wall segments 24, which surround hollow region 26.

Figure 2:
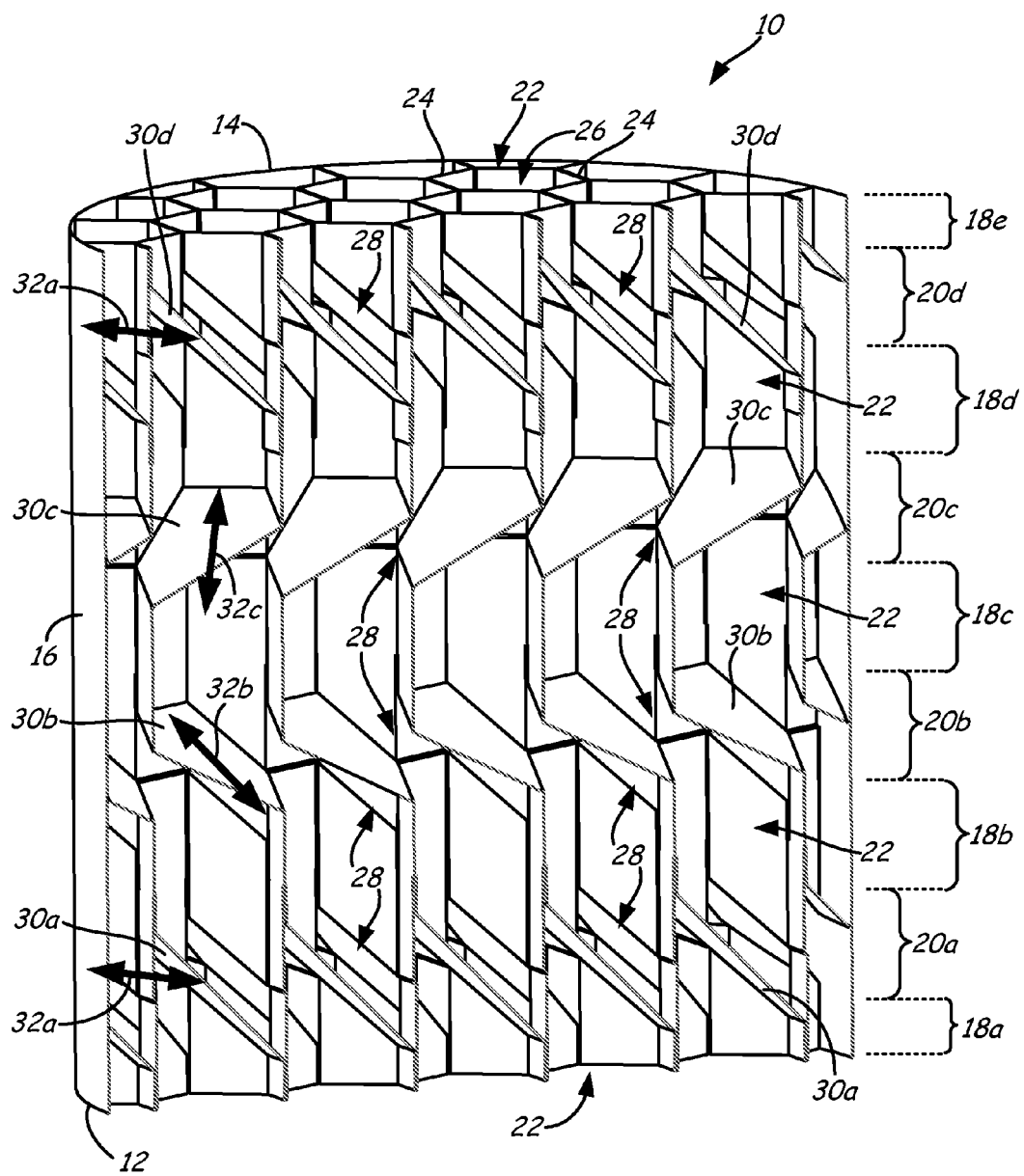
FIG. 2 is an isometric sectional view of section 3-3 taken in FIG. 1, illustrating internal cell layers and transition layers of the 3D part.

As further shown in FIG. 2, transition layers 20a are disposed between cell layers 18a and 18b, transition layers 20b are disposed between cell layers 18b and 18c, transition layers 20c are disposed between cell layers 18c and 18d, and transition layers 20d are disposed between cell layers 18d and 18e. Additionally, at the intersection of each set of cell layers 18 and its respective set of transition layers 20, the cross-sectional geometry of the layers change from the geometries of honeycomb cells 22 to create openings or ports 28. For example, at the intersection of cell layers 18e and transition layers 20d, each honeycomb cell 22 ends in a pair of ports 28, which extend into transition layers 20d to interconnect the honeycomb cells 22 of cell layers 18e with the honeycomb cells 22 of cell layers 18d.

In the shown embodiment, transition layers 20a, 20b, and 20c include the same geometries, except that their printing orientations are rotated in the x-y plane by 60 degrees from each other. For example, transition layers 20a may include sloped walls 30a, which may grow along first axis 32a having a first orientation in the x-y build plane.

In comparison, transition layers 20b may include sloped walls 30b, which may grow along second axis 32b having a second orientation that is rotated in the x-y plane by 60 degrees from first axis 32a. Similarly, transition layers 20c may include sloped walls 30c, which may grow along second axis 32c having a third orientation that is rotated in the x-y plane by 60 degrees from second axis 32b (and that are also rotated in the x-y plane by 60 degrees from first axis 32a). In some embodiments, first axis 32a, second axis 32b, and third axis 32c may be rotated in the x-y plane at different angles, such as from about 50 degrees to about 70 degrees.

As further shown in FIG. 2, sloped walls 30a, 30b, and 30c are grown at an angle above the x-y build plane. Accordingly, first axis 32a, second axis 32b, and third axis 32c may each be set at any suitable elevated angle above the x-y build plane (e.g., at about 45 degrees from vertical). Preferably, first axis 32a, second axis 32b, and third axis 32c are each set at the same elevated angle above the x-y build plane (e.g., each at about 45 degrees from vertical). In this preferred embodiment, the only distinction between first axis 32a, second axis 32b, and third axis 32c are the printing orientations in the x-y build plane.

This pattern may then be repeated with sloped walls 30d in transition layers 20d, which may grow along first axis 32a. As such, transition layers 20 may be printed in a repeating three-step pattern, which is one-half the number of sidewalls 24 exhibited by honeycomb cells 22. While not wishing to be bound by theory, it is believed that this pattern generates the interconnections between cell layers 18 to allow fluids to pass into substantially each honeycomb cell 22 in 3D part 10. However, this occurs in an indirect manner, where honeycomb cells 22 of a given set of cell layers 18 are not directly connected to the honeycomb cells 22 that are located directly above or below them. Instead, they are open to honeycomb cells 22 above and below them that are also laterally offset from each other in the x-y build plane.

Figure 3A:
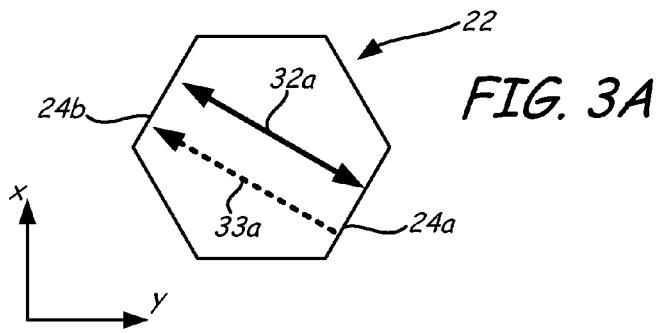
FIGS. 3A-3D are top views of honeycomb cells of layers of the 3D part, illustrating the rotation of printing orientations between transition layers.

FIGS. 3A-3D further illustrate the rotations of the printing orientations in the x-y build plane between transition layers 20. For instance, as shown in FIG. 3A, when printing transition layers 20a over cell layers 18a, the printing orientation may be set along first axis 32a, sloped walls 30a may be grown along first axis 32a, diverging from wall segment 24a and converging towards wall segment 24b, in the direction of arrow 33a.

Figure 3B:
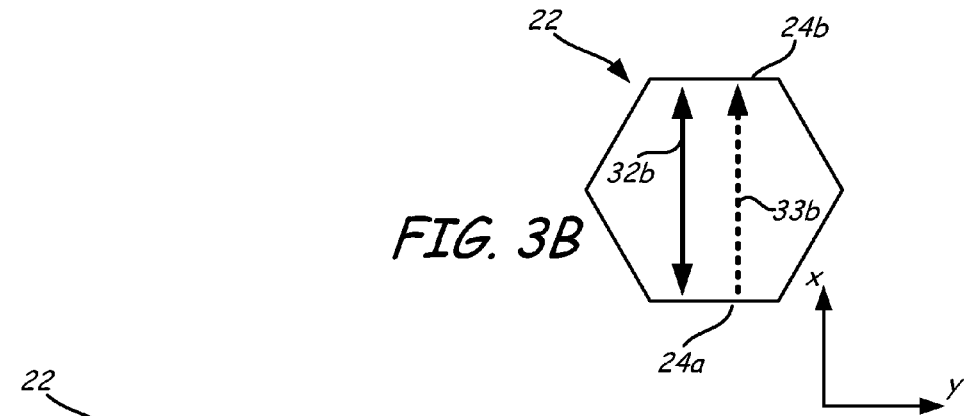

In comparison, as shown in FIG. 3B, when printing transition layers 20b over cell layers 18b, the printing orientation may be set along second axis 32b, which is rotated by 60 degrees in the x-y build plane from first axis 32a. In this case, sloped walls 30b may be grown along second axis 32b, diverging from wall segment 24a and converging towards wall segment 24b, in the direction of arrow 33b.

Figure 3C:
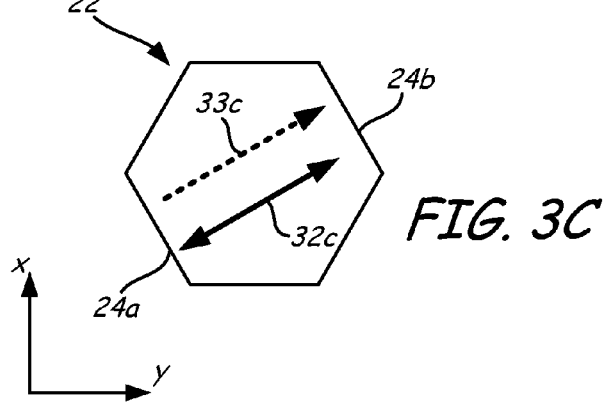

Furthermore, as shown in FIG. 3C, when printing transition layers 20c over cell layers 18c, the printing orientation may be set along third axis 32c, which is rotated by 60 degrees in the x-y build plane from second axis 32b. In this case, sloped walls 30c may be grown along third axis 32c, diverging from wall segment 24a and converging towards wall segment 24b, in the direction of arrow 33c.

Figure 3D:
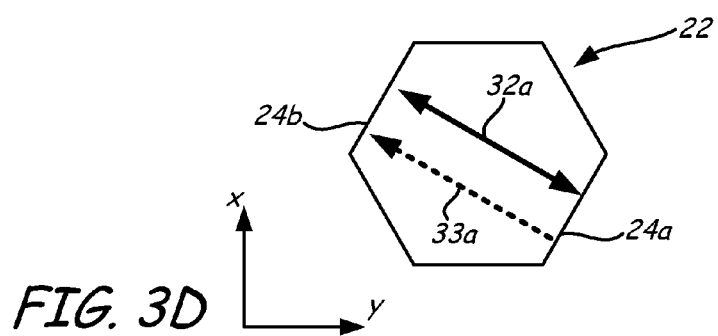

Finally, as shown in FIG. 3D, when printing transition layers 20d over cell layers 18d, system 34 may set the printing orientation back along first axis 32a to repeat the transition-layer pattern. In this case, sloped walls 30d may be grown along first axis 32a, diverging from wall segment 24a and converging towards wall segment 24b, in the direction of arrow 33a, in the same manner as discussed above for honeycomb cell 22 of cell layers 18a (shown above in FIG. 31A).

While hexagon hollow cells are preferred cell geometries for the cell layers in the 3D parts of the present disclosure, particularly when printed with extrusion-based additive manufacturing systems, the 3D parts of the present disclosure may have cell layers that define cell arrays with a variety of different hollow cell geometries. Preferably the geometry of each hollow cell has an even number of wall segments (e.g., four, six, eight, ten, and the like), where six wall segments (i.e., sidewalls 24 of honeycomb cells 22) are more preferred.

Furthermore, while cell layers 18 are illustrated herein as having the same hollow cell geometry (i.e., each set of cell layers 18 have honeycomb cells 22), cell layers 18 may alternatively have different hollow cell geometries within each cell layer and/or between successive sets of cell arrays. For example, cell layers 18a may alternatively define hollow cells having different cell geometries within the same array, and/or cell layers 18b may define the same or different cell geometries as defined by cell layers 18a.

As mentioned above, transition layers 20a, 20b, and 20c create a three-step pattern based on the rotated printing orientations, where transition layers 20d then repeat the same step as transition layers 20a. In some preferred embodiments, the number of repeated steps for transition layers 20 are based on the number of wall segments in the hollow cells of cell layers 18. For example, the printing orientations of transition layers 20 that are rotated in the x-y build plane may repeat after "n/2" sets of transition layers 20, where "n" is the number of wall segments of the hollow cells in cell layers 18 (i.e., half of the number of wall segments per hollow cell).

3D part 10 may be printed following the three-step pattern shown in FIGS. 2 and 3 for as many repetitions as desired. Furthermore, while illustrated as a cylindrical outer geometry with perimeter wall 16, the interconnected hollow pattern of 3D part 10 is also suitable for use with any desired outer geometry, and is not limited to simple geometries such as cylinders.

The interconnected hollow pattern of 3D part 10 is beneficial for numerous applications. For example, in some embodiments, such as when 3D part 10 is printed from a durable thermoplastic material, 3D part 10 may be used as a liquid reservoir that reduces sloshing of the retained liquids by compartmentalizing the liquid into the numerous honeycomb cells 22 and transition layers 20. This is particularly suitable for fuel storage containers, in which it is desirable to minimize the agitation of the fuel during transportation and storage.

Alternatively, 3D part 10 may be printed from a soluble support material to function as a soluble support structure core for a separate printed 3D part or other fabrication purpose (e.g., a removable carbon fiber core). In this embodiment, the interconnected hollow pattern of 3D part 10 allows a dissolution liquid or solution to flow through each hollow region, which increases the contact surface area for dissolving the soluble support material.

When used as a support structure, host computer 74 may receive a digital model of a second 3D part (e.g., from a customer), generate 3D part 10 as a support structure at overhanging regions of the second 3D part and/or in interior cavities. As such, host computer 74 may generate tool path instructions for printing 3D part 10 with system 34, along with tool path instructions for printing the second 3D part with system 34, and transmit them to controller 68 for performing the printing operation.

Additionally, the hollow pattern of 3D part 10 also allows the hollow regions 26 to remain interconnected even when the overall geometry of 3D part 10 bends around corners. Thus, 3D part 10 may retain substantial fluid interconnection regardless of the overall geometry of 3D part 10.

Figure 4:
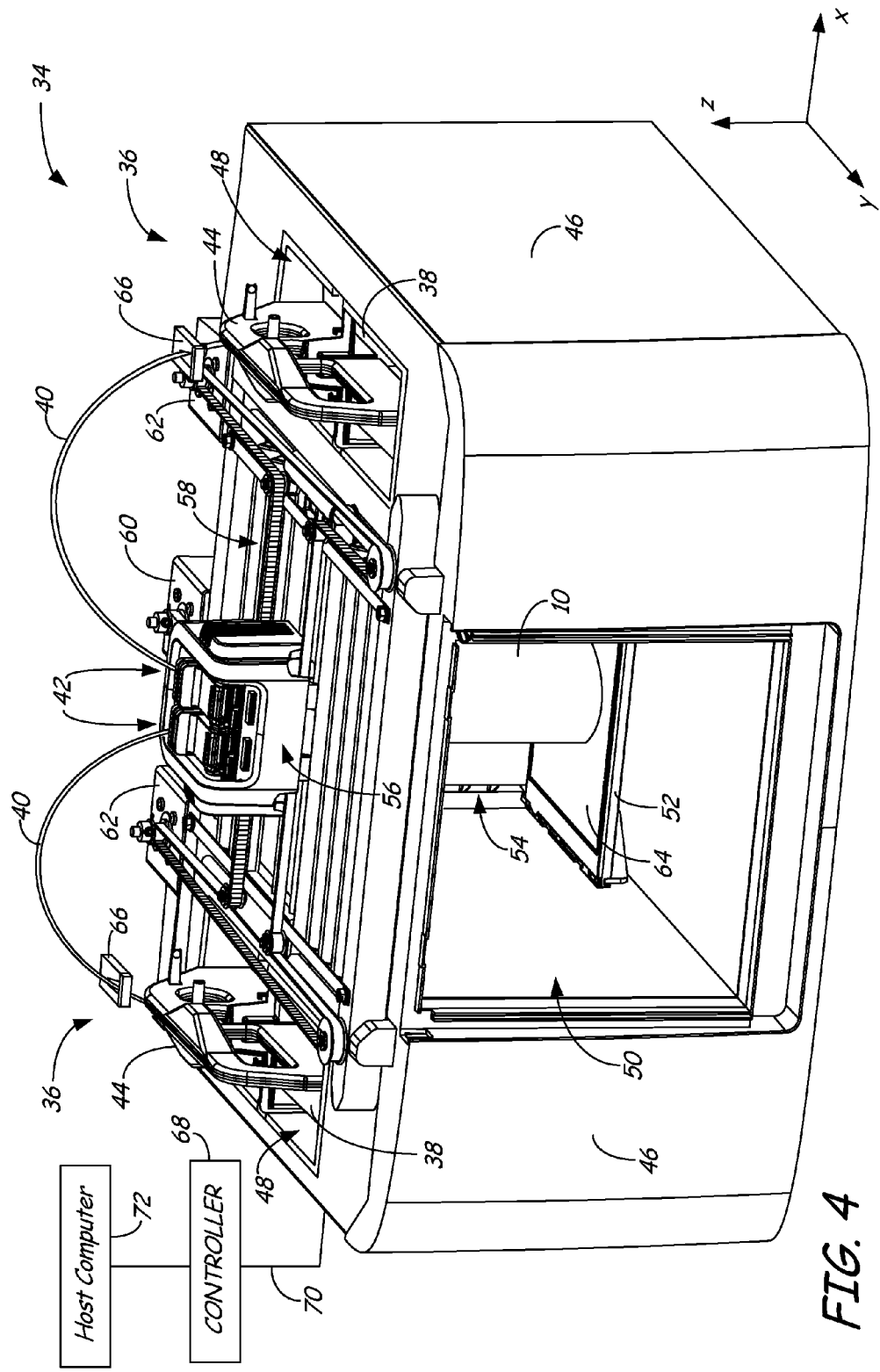
FIG. 4 is a top, front perspective view of an additive manufacturing system in use with consumable assemblies, for printing 3D parts of the present disclosure.

The present disclosure is also directed to a method for generating and printing the 3D parts of the present disclosure (e.g. 3D part 10) with a host computer and an additive manufacturing system. As shown in FIG. 4, system 34 is an example extrusion-based additive manufacturing system for printing the 3D parts of the present disclosure (e.g., 3D part 10) from part and/or support material filaments using a layer-based, additive manufacturing technique. Suitable additive manufacturing systems for system 34 include extrusion-based systems developed by Stratasys, Inc., Eden Prairie, Minn. under the trademarks "FDM" and "FUSED DEPOSITION MODELING". However, it is understood that the 3D parts of the present disclosure may be printed using any suitable additive manufacturing technique and related system.

FIG. 4 shows system 34 in use with two consumable assemblies 36, where each consumable assembly 36 is an easily loadable, removable, and replaceable container device that retains a supply of a consumable filament for printing with system 34. Typically, one of the consumable assemblies 36 contains a part material filament ("part material consumable assembly"), and the other consumable assembly 36 contains a support material filament ("support material consumable assembly"). However, both consumable assemblies 36 may be identical in structure.

In the shown embodiment, each consumable assembly 36 includes container portion 38, guide tube 40, print head 42, and handle 44. Container portion 38 may retain a spool or coil of a consumable filament, such as discussed in Mannella et al., U.S. patent application Ser. Nos. 13/334,910 and 13/334,921. Guide tube 40 interconnects container portion 38 and print head 42, where a drive mechanism of print head 42 may draws successive segments of the consumable filament from container portion 38 and through guide tube 40.

In this embodiment, guide tube 40 and print head 42 are subcomponents of consumable assembly 36, and may be interchanged to and from system 34 with each consumable assembly 36. In alternative embodiments, guide tube 40 and/or print head 42 may be components of system 34, rather than subcomponents of consumable assemblies 36.

As further shown, system 34 includes system casing 46, two bays 48, chamber 50, platen 52, platen gantry 54, head carriage 56, head gantry 58, z-axis motor 60, and a pair of x-y motors 62. System casing 46 is a structural component of system 34 and may include multiple structural sub-components such as support frames, housing walls, and the like. In the shown embodiment, system casing 46 defines the dimensions of bays 48, and of chamber 50. Bays 48 are container bays configured to respectively receive container portions 38 of consumable assemblies 36. Typically, each of bays 48 may be intended to receive either a part material consumable assembly 36 or a support material consumable assembly 36.

In an alternative embodiment, bays 48 may be omitted to reduce the overall footprint of system 34. In this embodiment, container portions 38 may stand adjacent to system casing 46, while providing sufficient ranges of movement for guide tubes 40 and print heads 42. Bays 48, however, provide convenient locations for loading consumable assemblies 36.

Chamber 50 is an enclosed environment that contains platen 52 for printing 3D part 10. Chamber 50 may be heated (e.g., with circulating heated air) to reduce the rate at which the part and support materials solidify after being extruded and deposited (e.g., to reduce distortions and curling). In alternative embodiments, chamber 50 may be omitted and/or replaced with different types of build environments. For example, 3D part 10 may be built in a build environment that is open to ambient conditions or may be enclosed with alternative structures (e.g., flexible curtains).

Platen 52 is a platform on which 3D part 10 is printed in a layer-by-layer manner, and is supported by platen gantry 54. In some embodiments, platen 52 may engage and support a build substrate 64, which may be a tray substrate as disclosed in Dunn et al., U.S. Pat. No. 7,127,309, fabricated from plastic, corrugated cardboard, or other suitable material, and may also include a flexible polymeric film or liner, painter's tape, polyimide tape (e.g., under the trademark KAPTON from E.I. du Pont de Nemours and Company, Wilmington, Del.), or other disposable fabrication for adhering deposited material onto the platen 52 or onto the build substrate 64. Platen gantry 54 is a gantry assembly configured to move platen 52 along (or substantially along) the vertical z-axis and is powered by z-axis motor 60.

Head carriage 56 is a unit configured to receive one or more removable print heads, such as print heads 42, and is supported by head gantry 58. Examples of suitable devices for head carriage 56, and techniques for retaining print heads 42 in head carriage 56, include those disclosed in Swanson et al., U.S. Publication Nos. 2010/0283172 and 2012/0164256.

As mentioned above, in some embodiments, guide tube 40 and/or print head 42 may be components of system 34, rather than subcomponents of consumable assemblies 36. In these embodiments, additional examples of suitable devices for print heads 42, and the connections between print heads 42 and head gantry 58 include those disclosed in Crump et al., U.S. Pat. No. 5,503,785; Swanson et al., U.S. Pat. No. 6,004,124; LaBossiere et al., U.S. Pat. Nos. 7,384,255 and 7,604,470; Batchelder et al., U.S. Pat. No. 7,896,209; and Comb et al., U.S. Pat. No. 8,153,182.

In the shown embodiment, head gantry 58 is a belt-driven gantry assembly configured to move head carriage 56 (and the retained print heads 42) in (or substantially in) a horizontal x-y plane above chamber 50, and is powered by x-y motors 62. Examples of suitable gantry assemblies for head gantry 58 include those disclosed in Comb et al., U.S. patent Ser. No. 13/242,561.

In an alternative embodiment, platen 52 may be configured to move in the horizontal x-y plane within chamber 50, and head carriage 56 (and print heads 42) may be configured to move along the z-axis. Other similar arrangements may also be used such that one or both of platen 52 and print heads 42 are moveable relative to each other. Platen 52 and head carriage 56 (and print heads 42) may also be oriented along different axes. For example, platen 52 may be oriented vertically and print heads 42 may print 3D part 10 along the x-axis or the y-axis.

As further shown in FIG. 4, system 34 may also include a pair of sensor assemblies 66, which, in the shown embodiment, are located adjacent to bays 48. Sensor assemblies 66 are configured to receive and retain guide tubes 40, while also providing sufficient ranges of movement for guide tubes 40 and print heads 42. Sensor assemblies 66 are configured to read encoded markings from successive segments of the consumable filaments moving through guide tubes 40. Examples of suitable devices for sensor assemblies 66 include those disclosed in Batchelder et al., U.S. Patent Application Publication Nos. 2011/0117268, 2011/0121476, and 2011/0233804.

System 34 also includes controller 68, which is one or more control circuits configured to monitor and operate the components of system 34. For example, one or more of the control functions performed by controller 68 can be implemented in hardware, software, firmware, and the like, or a combination thereof. Controller 68 may communicate over communication line 70 with print heads 42, chamber 50 (e.g., with a heating unit for chamber 50), head carriage 56, motors 60 and 62, sensor assemblies 66, and various sensors, calibration devices, display devices, and/or user input devices. In some embodiments, controller 68 may also communicate with one or more of bays 48, platen 52, platen gantry 54, head gantry 58, and any other suitable component of system 34.

While illustrated as a single signal line, communication line 70 may include one or more electrical, optical, and/or wireless signal lines, allowing controller 68 to communicate with various components of system 34. Furthermore, while illustrated outside of system 34, controller 68 and communication line 70 may be internal components to system 34.

System 34 and/or controller 68 may also communicate with one or more computer-based systems (not shown), such as host computer 72, which may include computer-based hardware, such as data storage devices, processors, memory modules and the like for generating, storing, and transmitting tool path and related printing instructions for 3D part 10 to system 34. Host computer 72 may be internal or external to system 34, and may include suitable hardware (e.g., processor, storage media, memory, user interfaces, and the like) to receive or generate a digital model of 3D part 10, to slice the digital model into the digital layers, generate any required support structures, generate any required tool paths, and transmit the resulting information to system 34 and/or controller 68.

During operation, controller 68 may direct z-axis motor 60 and platen gantry 54 to move platen 52 to a predetermined height within chamber 50. Controller 68 may then direct motors 62 and head gantry 58 to move head carriage 56 (and the retained print heads 42) around in the horizontal x-y plane above chamber 50. Controller 68 may also direct print heads 42 to selectively draw successive segments of the consumable filaments from container portions 38 and through guide tubes 40, respectively.

Each print head 42 preferably includes a liquefier assembly of the present disclosure, which thermally melts the successive segments of the received consumable filament such that the filament becomes a molten material. The molten material is then extruded and deposited onto platen 52 for printing 3D part 10 in a layer-by-layer manner. After the print operation is complete, the resulting 3D part 10 (and any additional support structure) may be removed from chamber 50, and the support structure may be removed from 3D part 10, if necessary. 3D part 10 may then undergo one or more additional post-processing steps, if desired.

Figure 5:
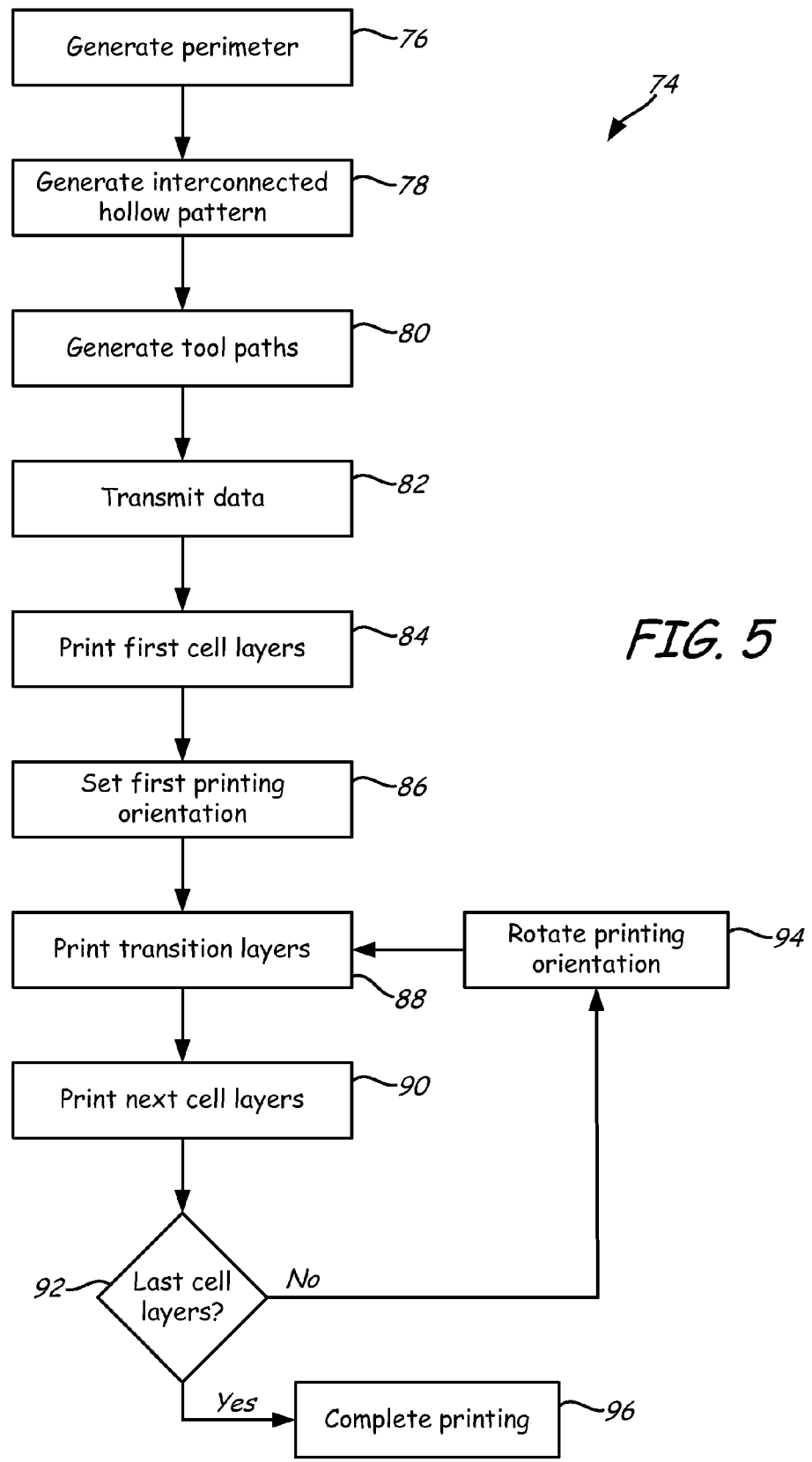
FIG. 5 is a flow diagram of a method for generating and printing 3D parts of the present disclosure.

FIG. 5 is a flow diagram of method 74 for printing 3D parts of the present disclosure with additive manufacturing systems. The following discussion of method 74 is made with reference to 3D part 10 and system 34 with the understanding that method 74 may also be used to print 3D parts of the present disclosure having a variety of geometries, and with any suitable additive manufacturing technique and system.

As shown in FIG. 5, method 74 includes steps 76-96, and initially involves generating or otherwise identifying the perimeter(s) of each layer of 3D part 10 (step 76), and generating the interconnected hollow pattern in the interior region(s) of the perimeter(s) (step 78), using host computer 72. For example, host computer 72 may received a digital model corresponding to 3D part 10, slice the digital model, generate the interconnected hollow pattern (if not already present), generate any required supports, and the like. Host computer 72 may then generate tool paths (or other suitable system instructions) (step 80), and transmit the resulting data to system 34 and/or controller 68 (step 82). System 34 may then perform steps 84-96 of method 74 based on the received data.

For example, system 34 may initially print cell layers 18a having honeycomb cells 22 onto platen 52, build substrate 64, and/or an underlying support structure (step 84). System 34 may then start to print transition layers 20a by initially identifying a printing orientation in the x-y build plane along first axis 32a (step 86), and then printing transition layers 20a with the identified printing orientation (step 88). As discussed below, this diverges the wall segments 24 of honeycomb cells 22 at cell layers 18a to grow sloped walls 30a along first axis 32a.

The completion of transition layers 20a preferably converges sloped walls 30a into adjacent wall segments 24 to start the next array of honeycomb cells 22 for cell layers 18b. Accordingly, system 34 may then print cell layers 18b having honeycomb cells 22 (step 90). In the current situation, cell layers 18b are not the final layers of 3D part 10 (step 92). As such, system 34 may then rotate the printing orientation in the x-y build plane to extend along second axis 32b (i.e., 60 degrees from first axis 32a) (step 94), and then print transition layers 20b (step 88). This also preferably diverges the wall segments 24 of honeycomb cells 22 at cell layers 18b to grow sloped walls 30b along second axis 32b.

The completion of transition layers 20b preferably converges sloped walls 30b into adjacent wall segments 24 to start the next array of honeycomb cells 22 for cell layers 18c. Accordingly, system 34 may then print cell layers 18c having honeycomb cells 22 (step 90). In the current situation, cell layers 18c are still not the final layers of 3D part 10 (step 92). As such, system 34 may then rotate the printing orientation in the x-y build plane to extend along third axis 32c (i.e., 60 degrees from second axis 32c) (step 94), and then print transition layers 20c (step 88). This preferably diverges the wall segments 24 of honeycomb cells 22 at cell layers 18c to grow sloped walls 30c along second axis 32c.

The completion of transition layers 20c preferably converges sloped walls 30c into adjacent wall segments 24 to start the next array of honeycomb cells 22 for cell layers 18d. Accordingly, system 34 may then print cell layers 18d having honeycomb cells 22 (step 90). In the current situation, cell layers 18d are still not the final layers of 3D part 10 (step 92). As such, system 34 may then rotate the printing orientation in the x-y build plane to extend back along first axis 32a, and then print transition layers 20d (step 88). This preferably diverges the wall segments 24 of honeycomb cells 22 at cell layers 18d to grow sloped walls 30d along first axis 32a.

The completion of transition layers 20d preferably converges sloped walls 30d into adjacent wall segments 24 to start the next array of honeycomb cells 22 for cell layers 18e. Accordingly, system 34 may then print cell layers 18e having honeycomb cells 22 (step 90). In the current situation, cell layers 18e are the final layers of 3D part 10 (step 92). Therefore, system 34 may then complete any additional printing of 3D part 10 (e.g., printing a top surface, if desired) (step 96). The resulting 3D part 10 may then be removed from system 34 and undergo post-processing, if desired.

Figure 6:
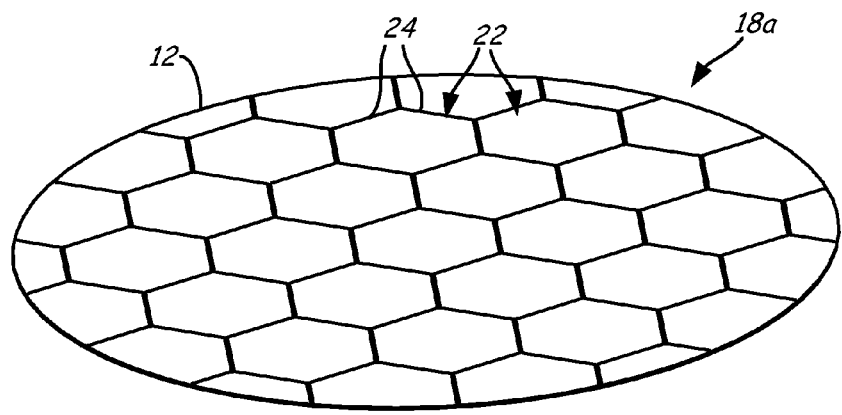
FIGS. 6-30 are isometric views and side illustrations of steps for printing the 3D part of the present disclosure, as depicted in FIGS. 1 and 2.
Figure 7:
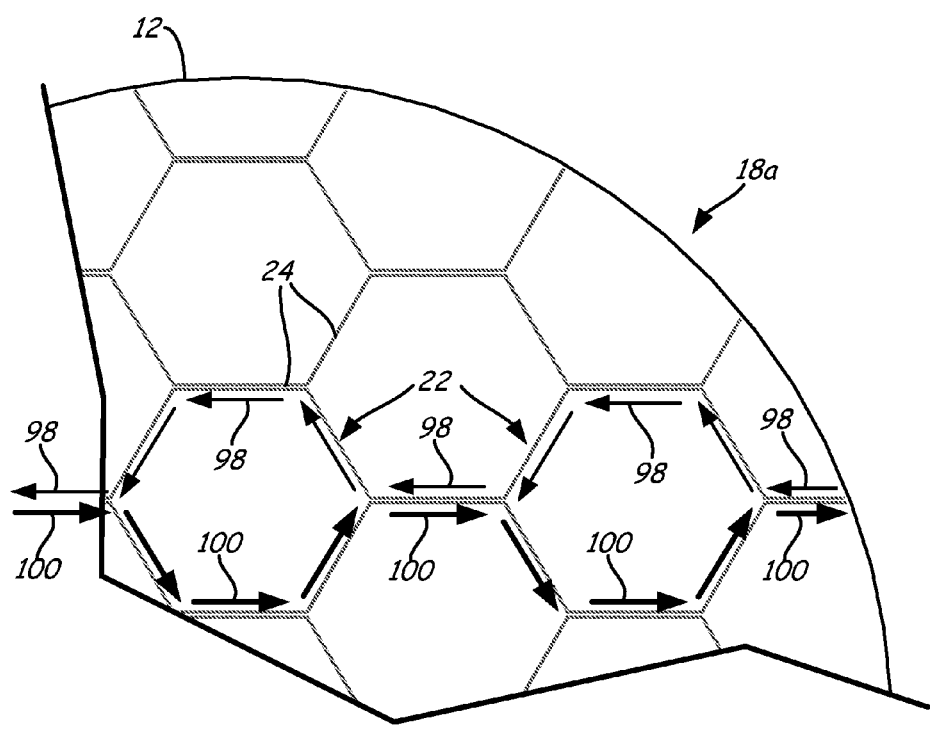

FIGS. 6-30 illustrate an application of method 74 for printing 3D part 10 with system 34. As shown in FIG. 6, system 34 may print cell layers 18a defining the array of honeycomb cells 22 having abutting wall segments 24. For example, as shown in FIG. 7, print head 42 may follow the tool paths illustrated by arrows 98 while traveling inward from perimeter wall 16, and then follow the tool paths illustrated by arrows 100 while traveling outward towards perimeter wall 16. As mentioned above, the hexagon geometries of honeycomb cells 22 are preferred cell geometries for use with extrusion-based additive manufacturing systems. This can be appreciated by the tool paths of arrows 98 and 100, which allow print head 42 to move at high rates while printing the roads for honeycomb cells 22.

Figure 8:
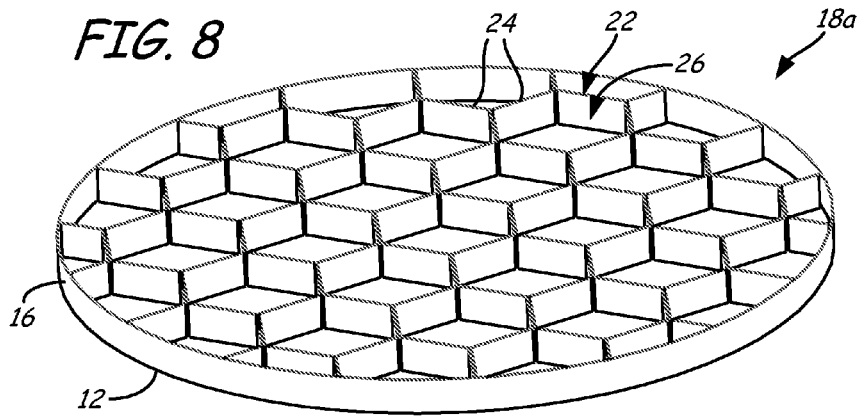
Figure 9:
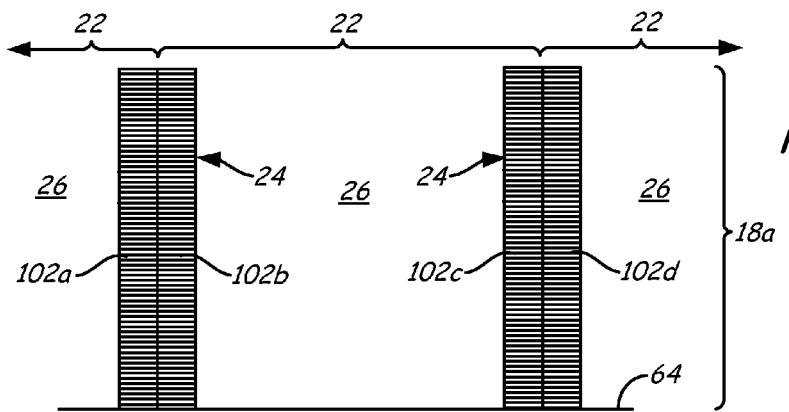

As further shown in FIG. 8, system 34 may continue to print cell layers 18a along the z-axis until the final layer of cell layers 18a is completed. FIG. 9 illustrates abutting wall segments 24 of adjacent honeycomb cells 22, referred to as wall segments 102a-102d, where wall segments 102a and 102b abut each other, and wall segments 102c and 102d abut each other.

Figure 10:
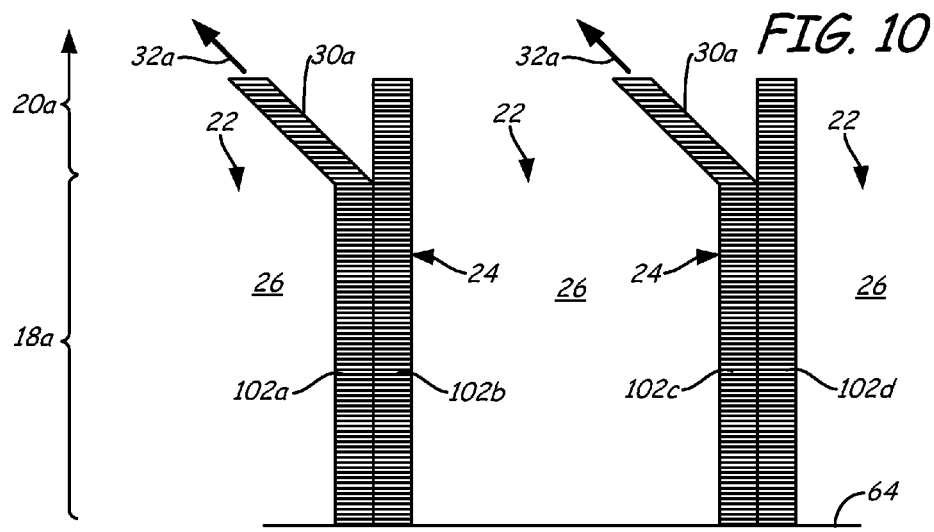
Figure 11:
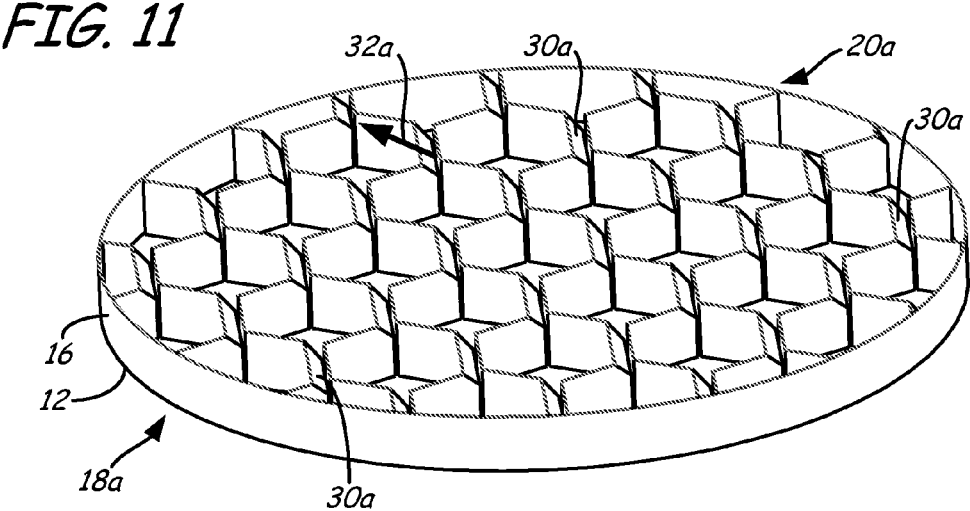
Figure 12:
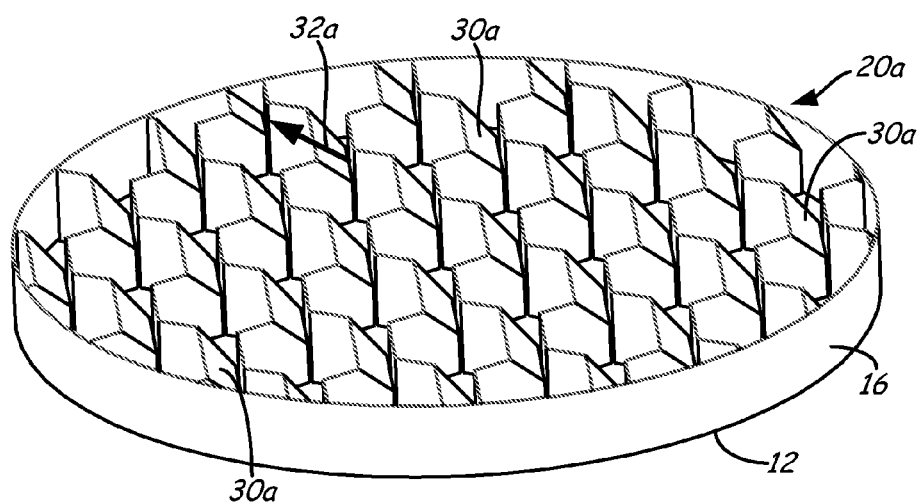
Figure 13:
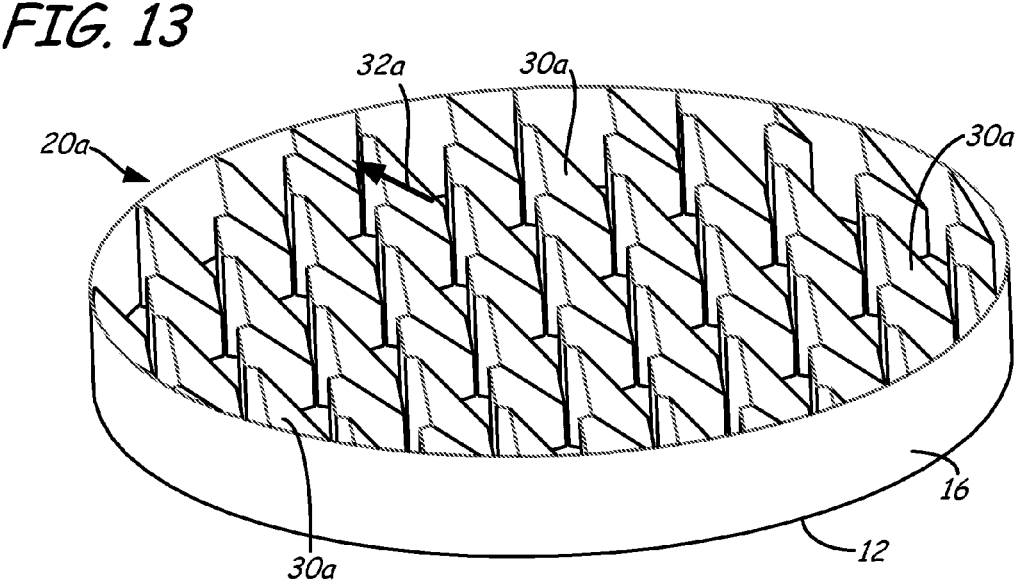

As further shown in FIG. 10, after cell layers 18a are completed, system 34 may then print transition layers 20a. In particular, system 34 may print the layers for adjacent wall segments 102a-102d such that wall segments 102a and 102c respectively diverge from wall segments 102b and 102d. This creates sloped walls 30a that grow along first axis 32a. In comparison, system 34 may continue to print wall segments 102b and 102d upward along the z-axis.

As shown, wall segments 24 of honeycomb cells 22 are illustrated as pairs of abutting wall segments (e.g., wall segments 102a-102b and wall segments 102c-102d). However, in alternative embodiments, wall segments 24 may each only include a single wall segment, where adjacent honeycomb cells 22 share the same wall segment 24. In this embodiment, sloped walls 30a may then grow from this single wall segment in a similar manner to that shown in FIG. 10. However, the use of abutting wall segments is preferred such that print head 42 may move at high rates while printing the roads for honeycomb cells 22.

FIGS. 11-20 illustrate successive steps for printing transition layers 20a over cell layers 18a, where FIGS. 11-15 illustrate the printing of the lower half of transition layers 20a.

Figure 14:
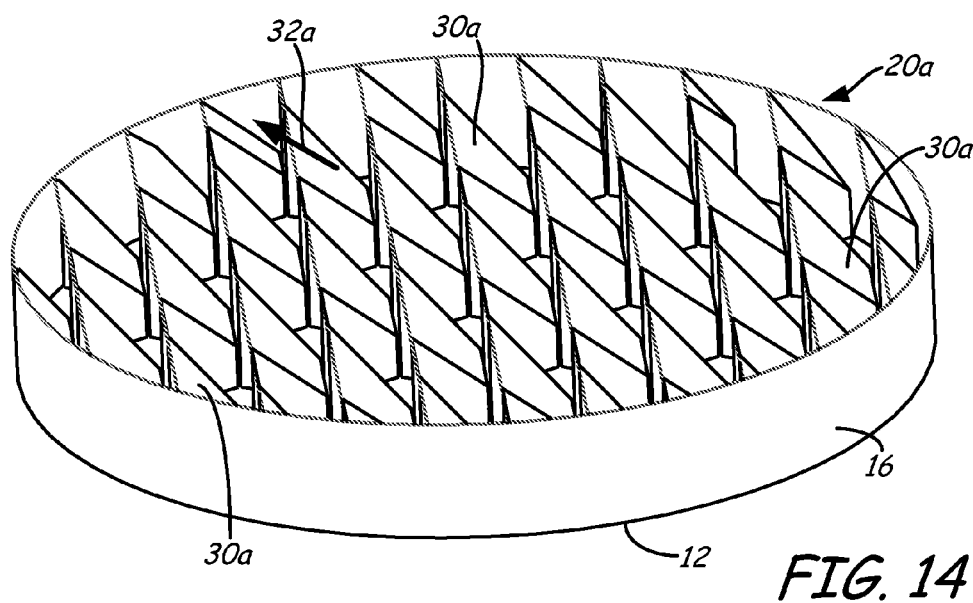
Figure 15:
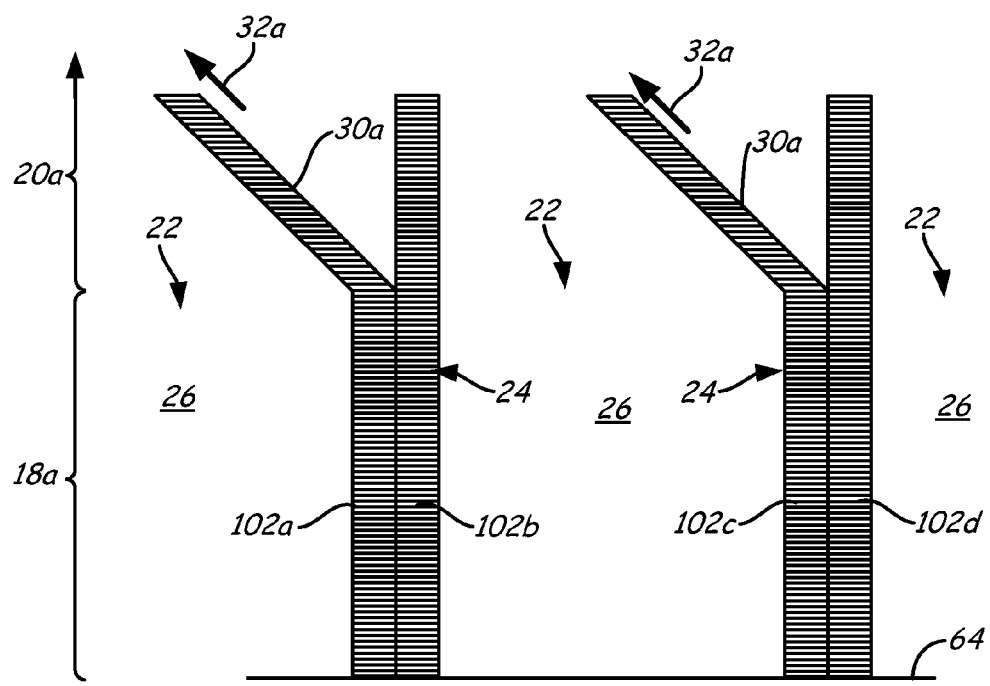
Figure 16:
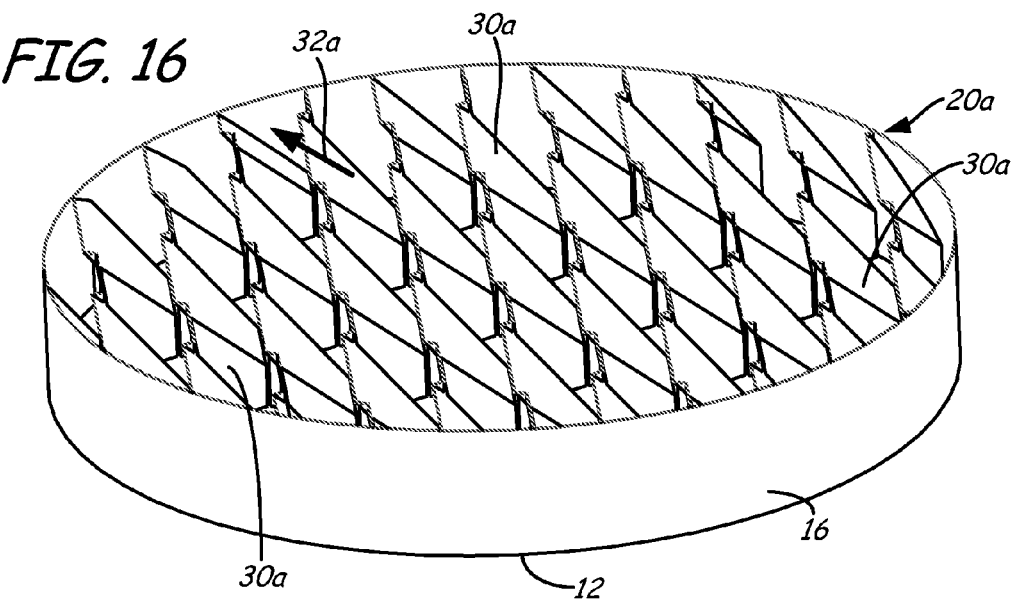
Figure 17:
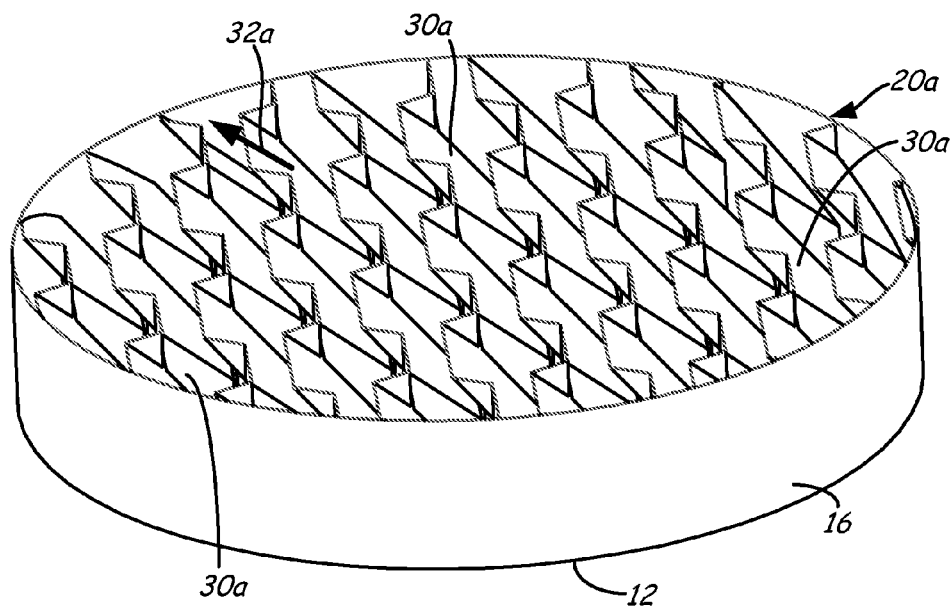
Figure 18:
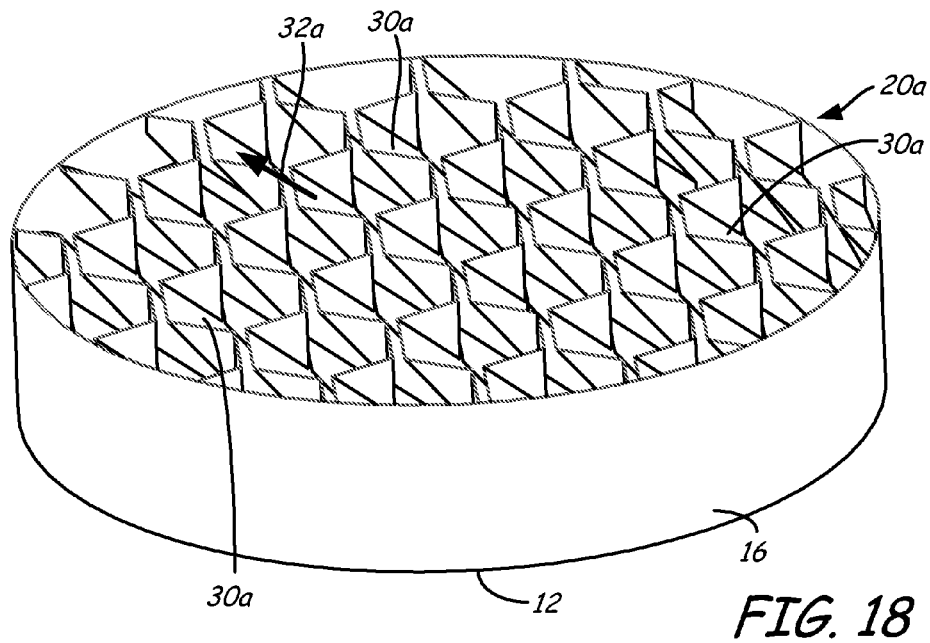

For example, as shown in FIGS. 14 and 15, when transition layers 20a are half-way completed (i.e., half of the layers have been printed), sloped walls 30a may extend half way over hollow regions 26 of honeycomb cells 22.

Figure 19:
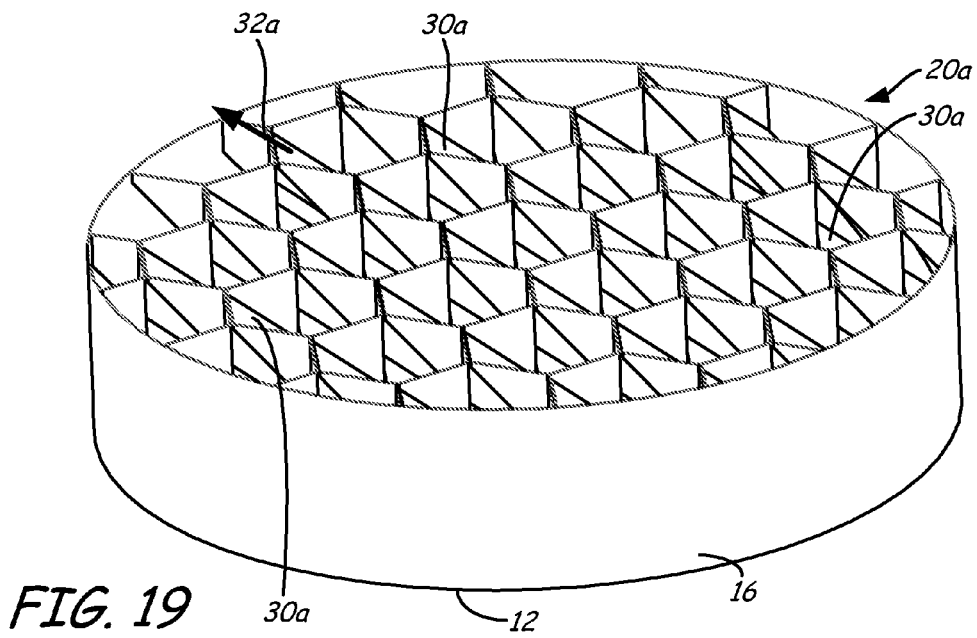
Figure 20:
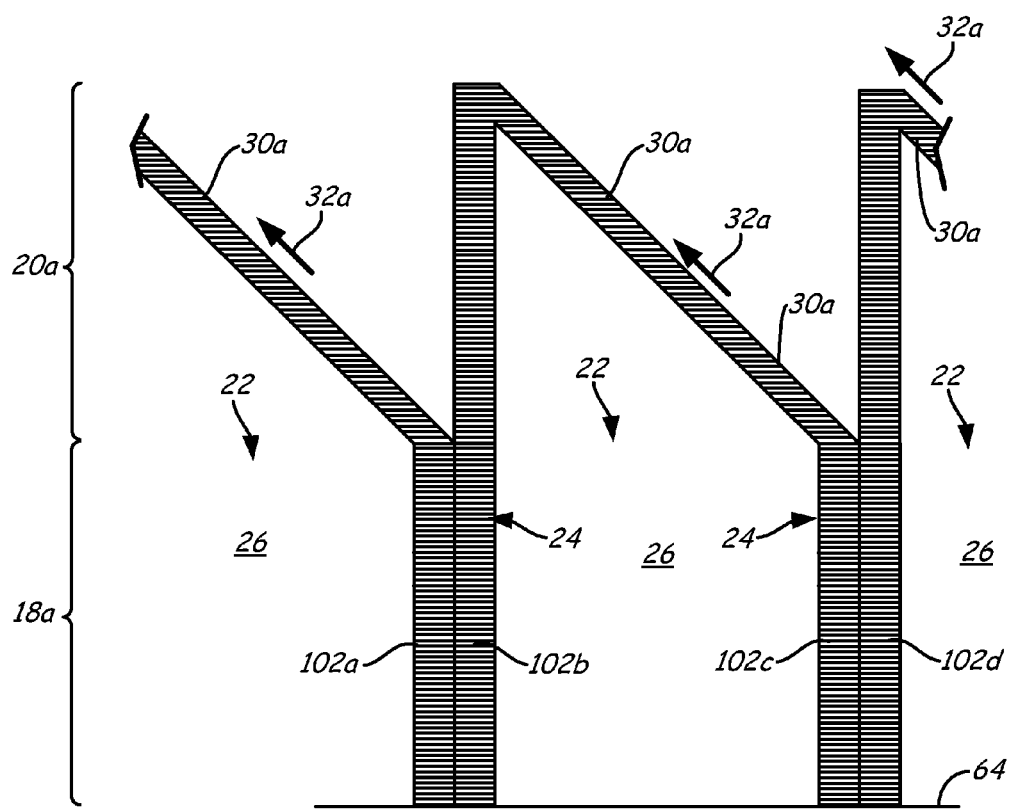

FIGS. 16-20 accordingly illustrate the printing of the upper half of transition layers 20a, where sloped walls 30a converge towards their adjacent upwardly extending wall segments (e.g., wall segments 102b and 102d). As shown in FIGS. 19 and 20, when transition layers 20a are completed, the sloped walls 30a have converged into the adjacent upwardly extending wall segments to provide a base for the subsequent honeycomb cells 22 of cell layers 18b.

Figure 21:
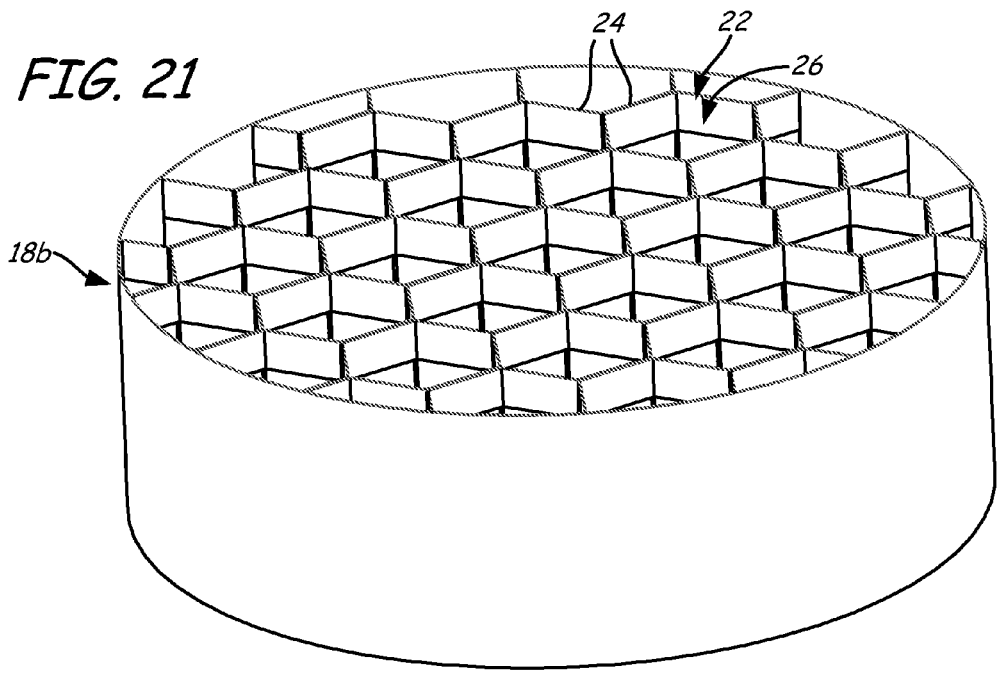
Figure 22:
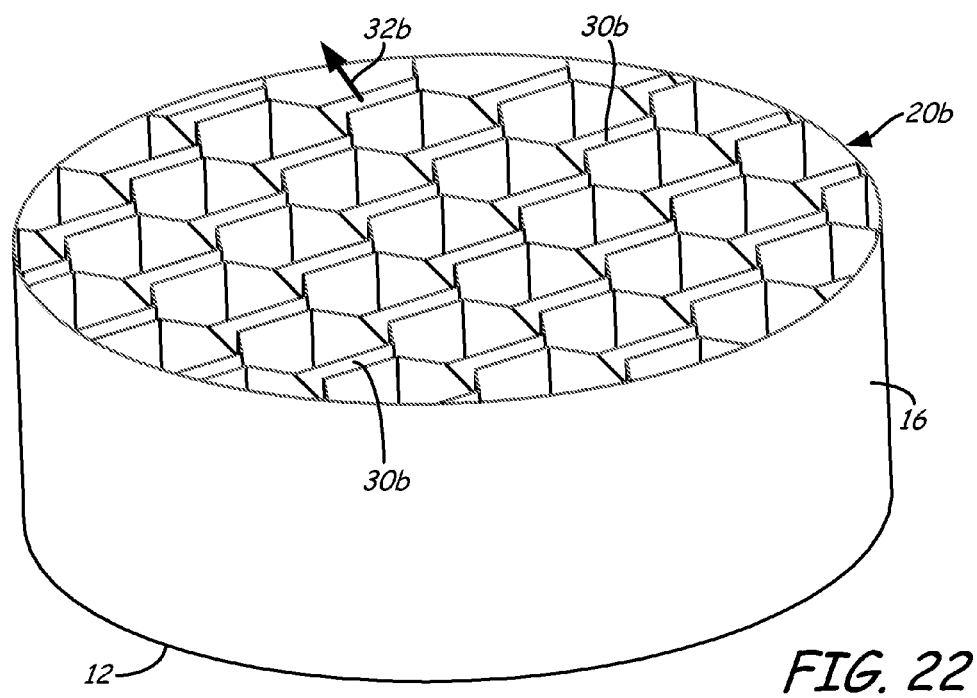
Figure 23:
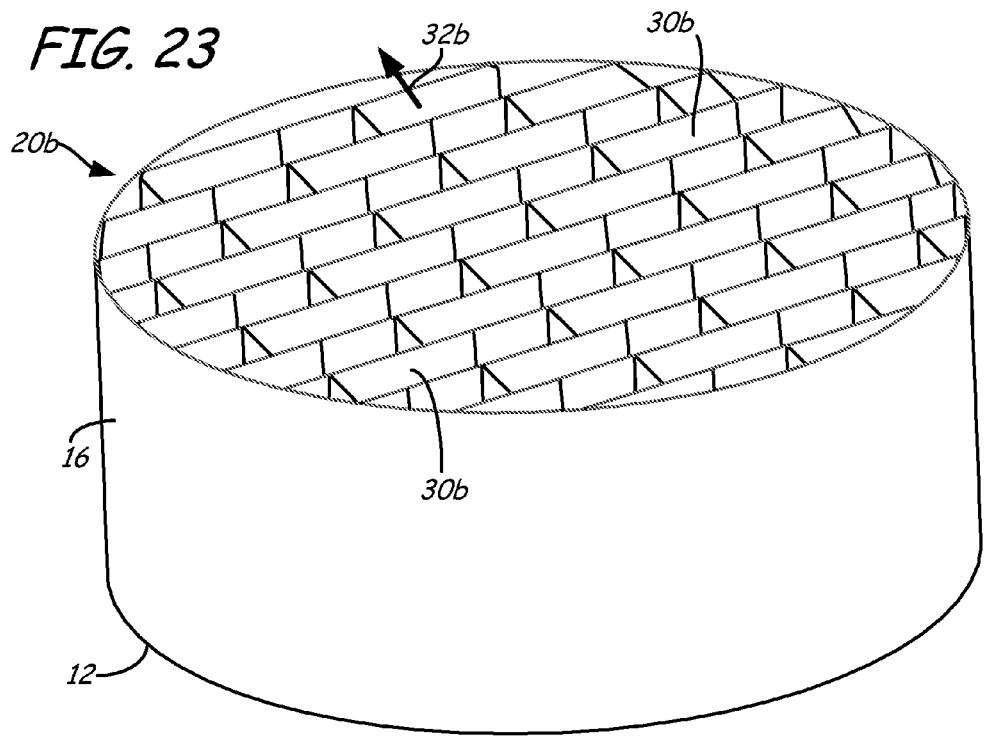
Figure 24:
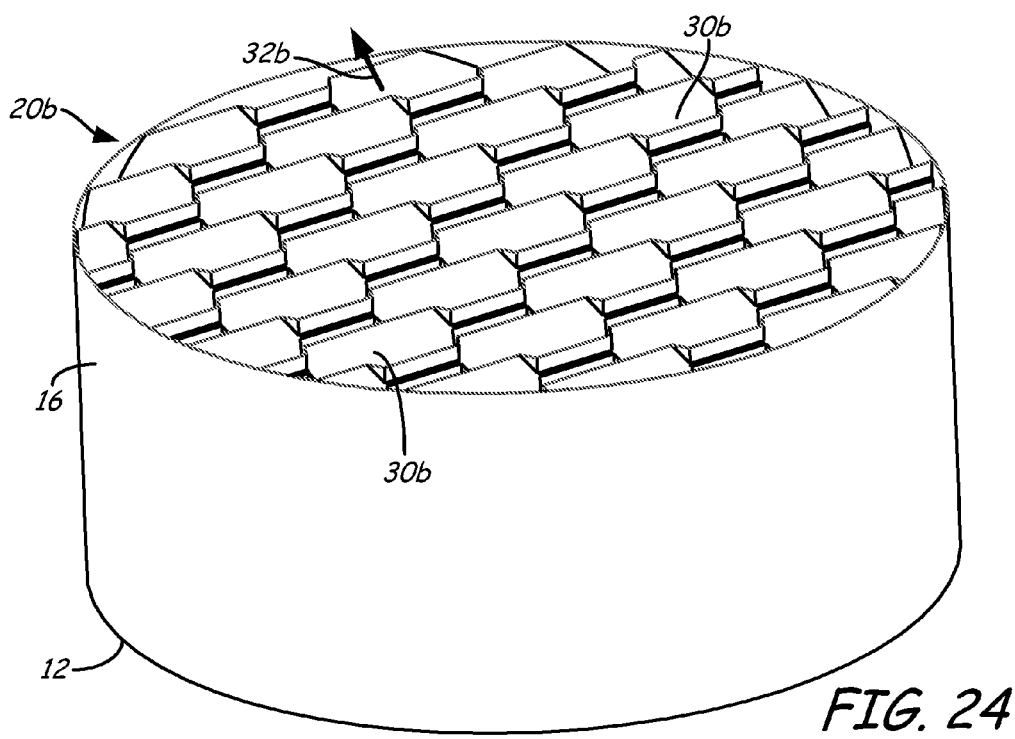
Figure 25:
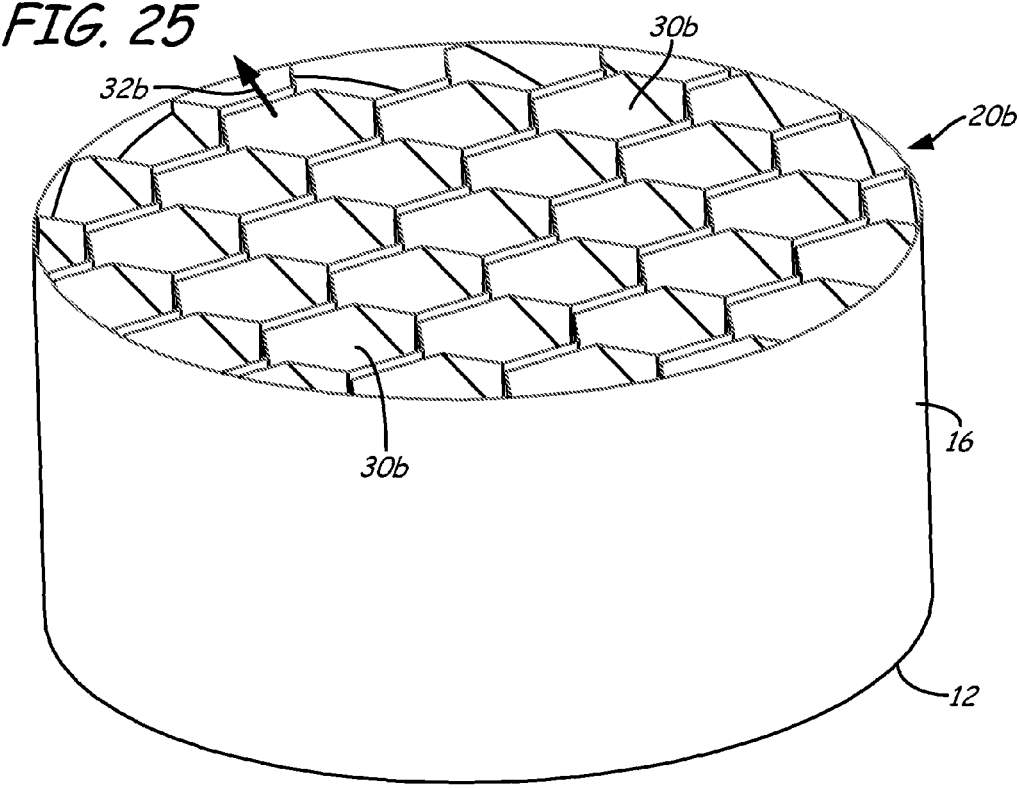

As shown in FIG. 21, system 34 may then print cell layers 18b along the z-axis over transition layers 20a until the final layer of cell layers 18b is completed. This may be performed in the same manner as discussed above for cell layers 18a. As can be appreciated, in the shown embodiment, the honeycomb cells 22 of each successive set of cell layers 18 are substantially aligned in the x-y build plane (i.e., substantially over each other). Thus, cell layers 18 may have substantially the same cross-sectional geometries and orientations in the x-y-z coordinate system. As mentioned above, the use of transition layers 20 interconnects the honeycomb cells 22 in both lateral and vertical directions. However, this occurs in an indirect manner, where honeycomb cells 22 of a given set of cell layers 18 are not directly connected to the honeycomb cells 22 that are located directly above or below them. Instead, they are open to honeycomb cells 22 above and below them that are also laterally offset from each other in the x-y build plane, as mentioned above.

Figure 26:
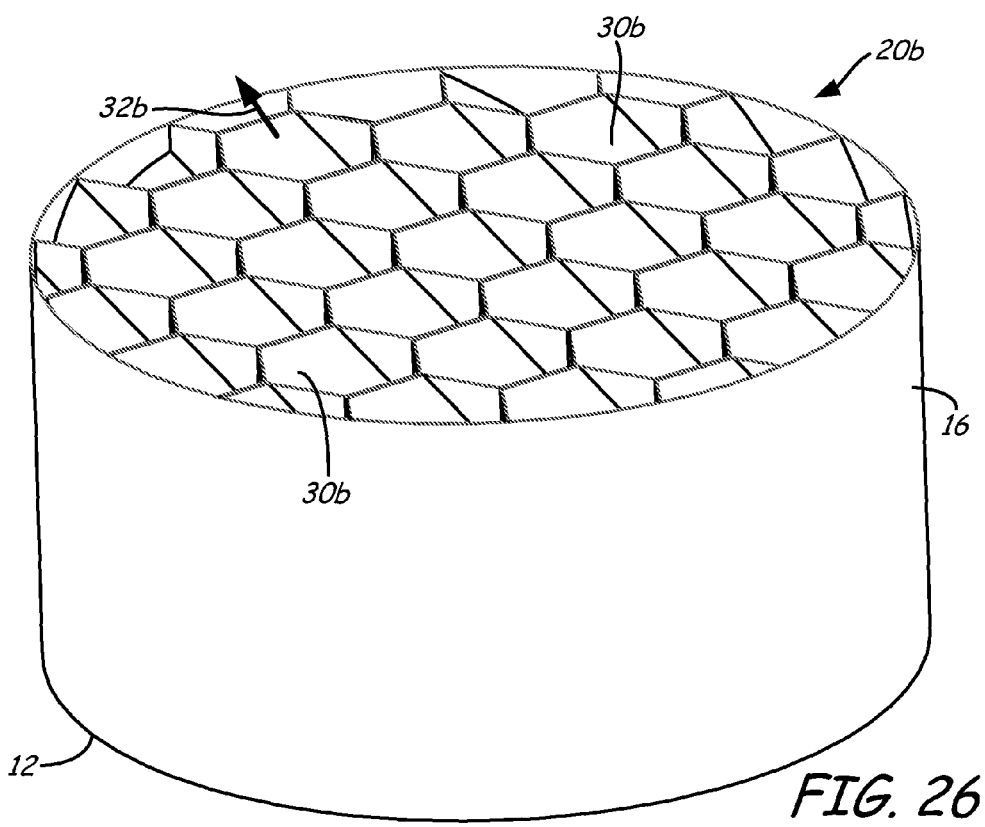

As shown in FIGS. 22-26, after cell layers 18b are completed, system 34 may then print transition layers 20b. This may be performed in the same manner as discussed above for transition layers 20a, except that the diverging wall segments that create sloped walls 30b grow along second axis 32b, which is rotated 60 degrees in the x-y build plane from first axis 32a. As shown in FIG. 26, when transition layers 20b are completed, the sloped walls 30b have converged into the adjacent upwardly extending wall segments to provide a base for the subsequent honeycomb cells 22 of cell layers 18c.

Figure 27:
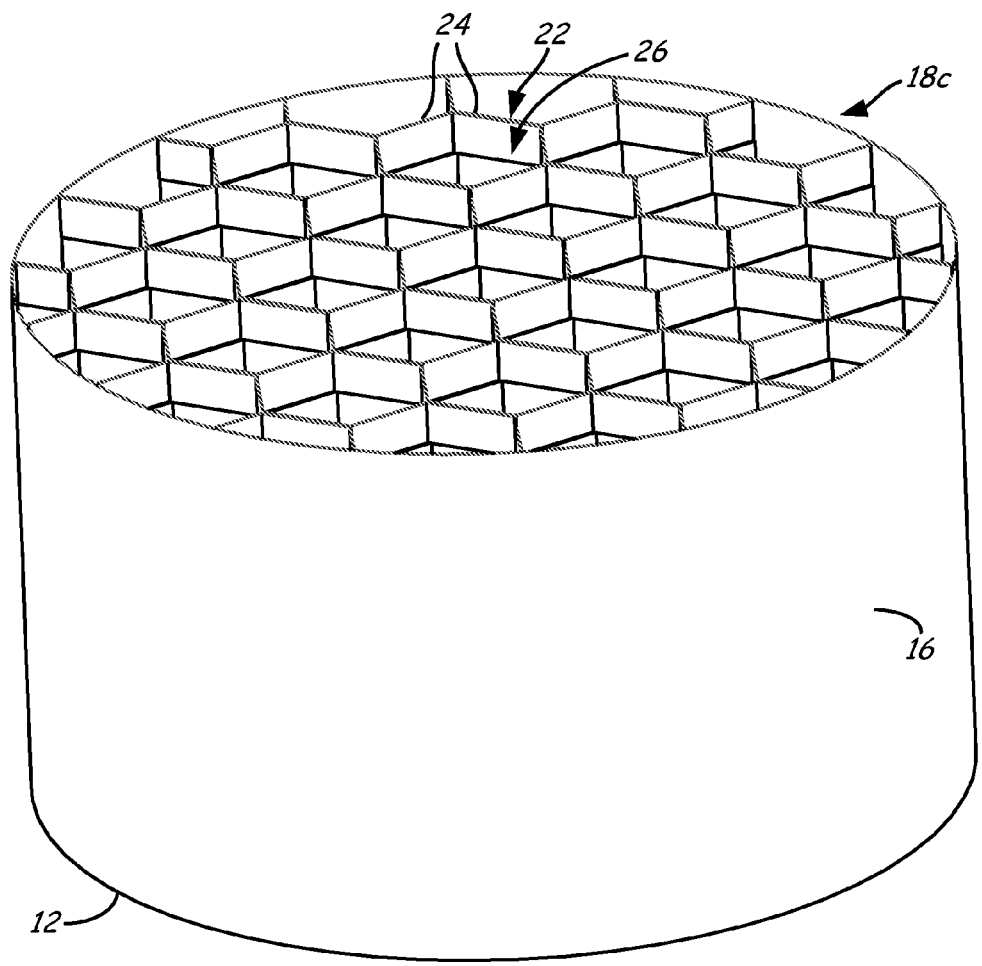

As shown in FIG. 27, system 34 may then print cell layers 18c along the z-axis over transition layers 20b until the final layer of cell layers 18c is completed. This may also be performed in the same manner as discussed above for cell layers 18a and 18b.

Figure 28:
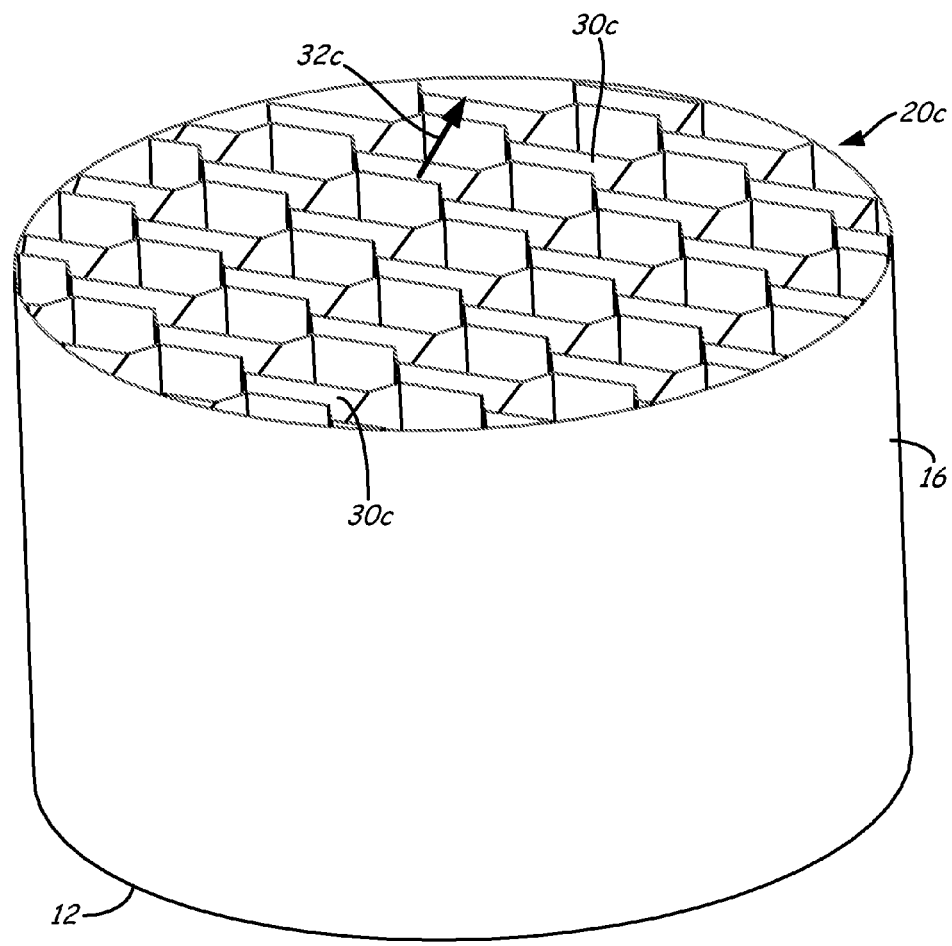
Figure 29:
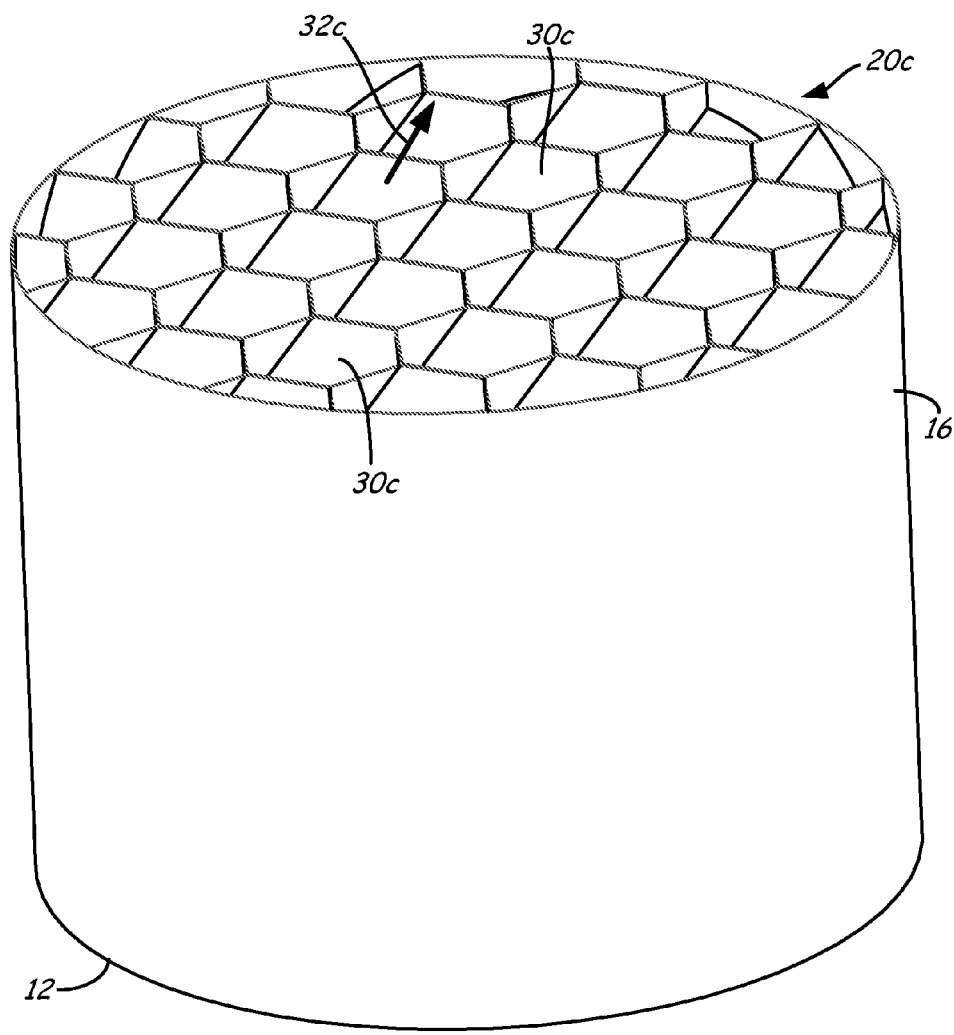

As shown in FIGS. 28 and 29, after cell layers 18c are completed, system 34 may then print transition layers 20c. This may also be performed in the same manner as discussed above for transition layers 20a and 20b, except that the diverging wall segments that create sloped walls 30c grow along third axis 32c, which is rotated 60 degrees in the x-y build plane from second axis 32b. As shown in FIG. 29, when transition layers 20b are completed, the sloped walls 30c have converged into the adjacent upwardly extending wall segments to provide a base for the subsequent honeycomb cells 22 of cell layers 18d.

Figure 30:
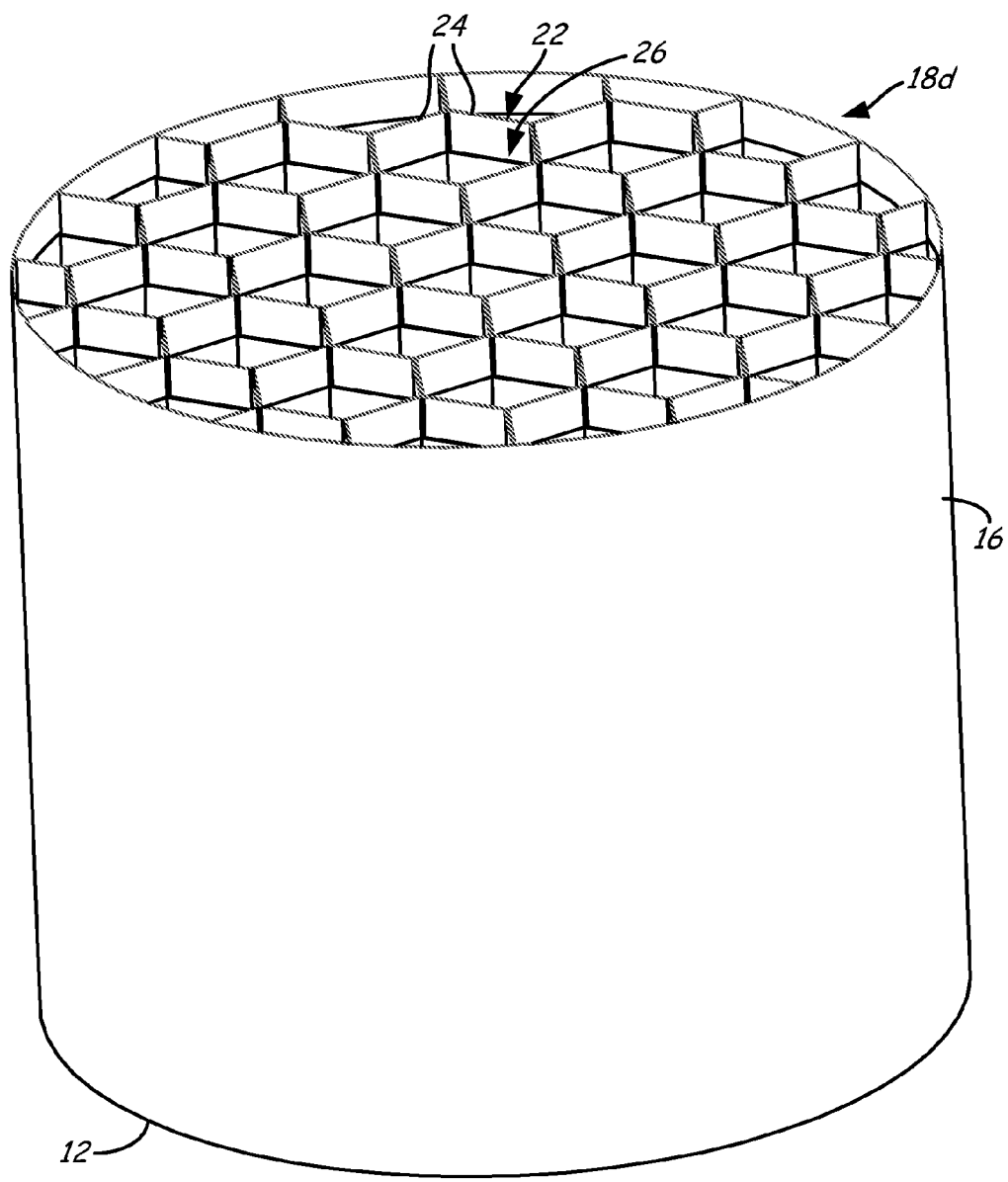

As shown in FIG. 30, system 34 may then print cell layers 18d along the z-axis over transition layers 20c until the final layer of cell layers 18d is completed. This may also be performed in the same manner as discussed above for cell layers 18a, 18b, and 18c. After cell layers 18d are completed, system 34 may then print transition layers 20d, which may be performed in the same manner as discussed above for transition layers 20a with the diverging wall segments creating sloped walls 30d that grow along first axis 32a.

As discussed above, transition layers 20a, 20b, and 20c define a repeating three-step pattern of transition layers that separate adjacent cell layers 18a-18d. This interconnects the hollow regions 26 of the honeycomb cells 22 in cell layers 18a-18d to allow fluids to flow therethrough both laterally and vertically. Hence, transition layers 20d repeat the transition-layer pattern of transition layers 20a.

Finally, system 34 may then print cell layers 18e along the z-axis over transition layers 20d until the final layer of cell layers 18e is completed (i.e., top layer 14 of 3D part 10). If desired, the same process may be repeated for as many repetitions until the desired height of 3D part 10 is reached. Between each additional set of transition layers 20, system 34 may rotate the printing orientation by the predetermined amount in the x-y build plane (e.g., by 60 degrees).

As mentioned above, while hexagon hollow cells are preferred cell geometries for the cell layers in the 3D parts of the present disclosure, particularly when printed with extrusion-based additive manufacturing systems, the 3D parts of the present disclosure may have cell layers that define cell arrays with a variety of different hollow cell geometries. For example, FIGS. 31-49 illustrate an alternative 3D part 110 that may be printed pursuant to method 74 (shown in FIG. 5).

Figure 31:
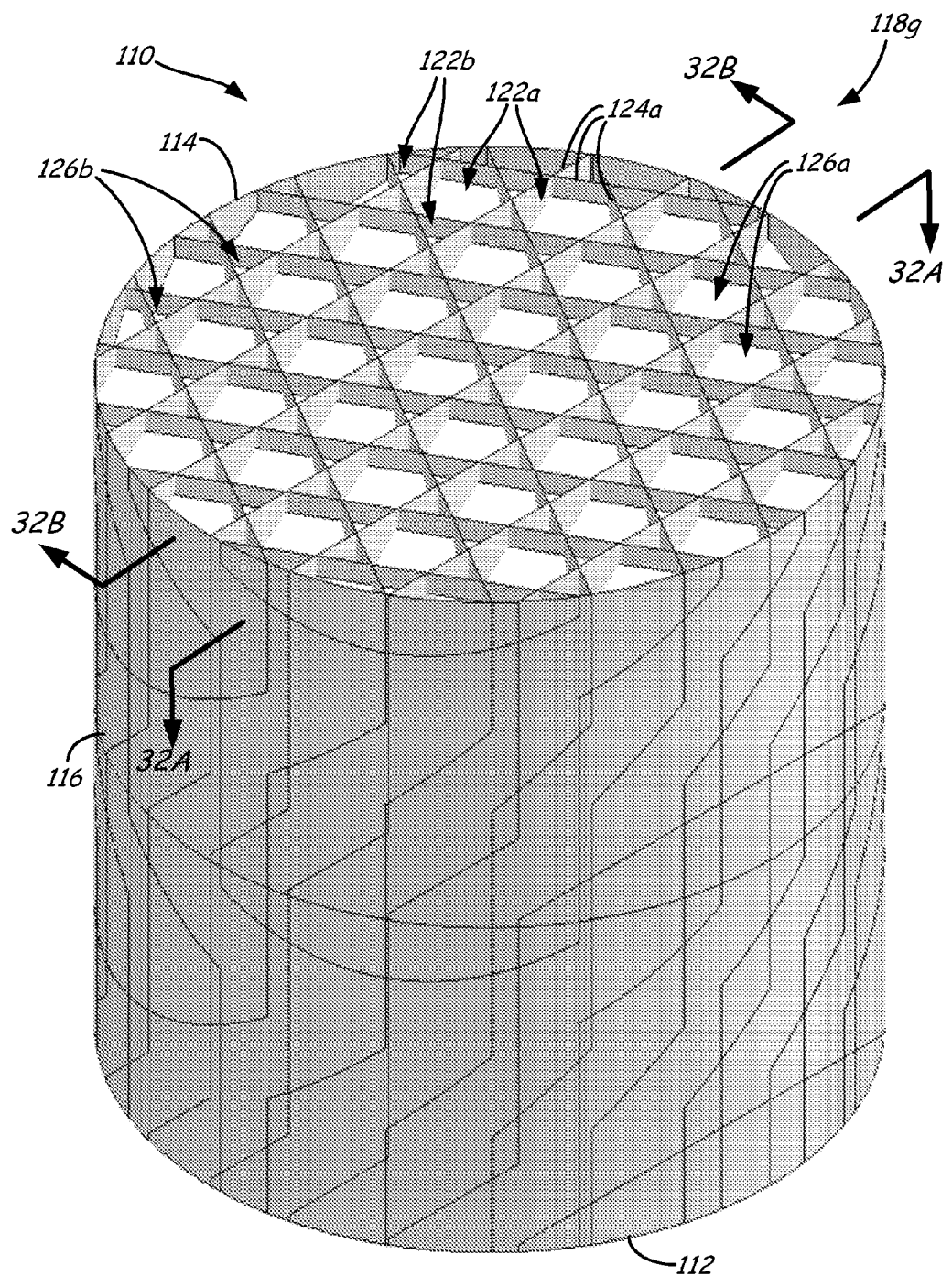
FIG. 31 is an isometric view of an alternative 3D part of the present disclosure having an interconnected hollow pattern with cell geometries that vary between hexagram cells and triangle cells.
Figure 32A:
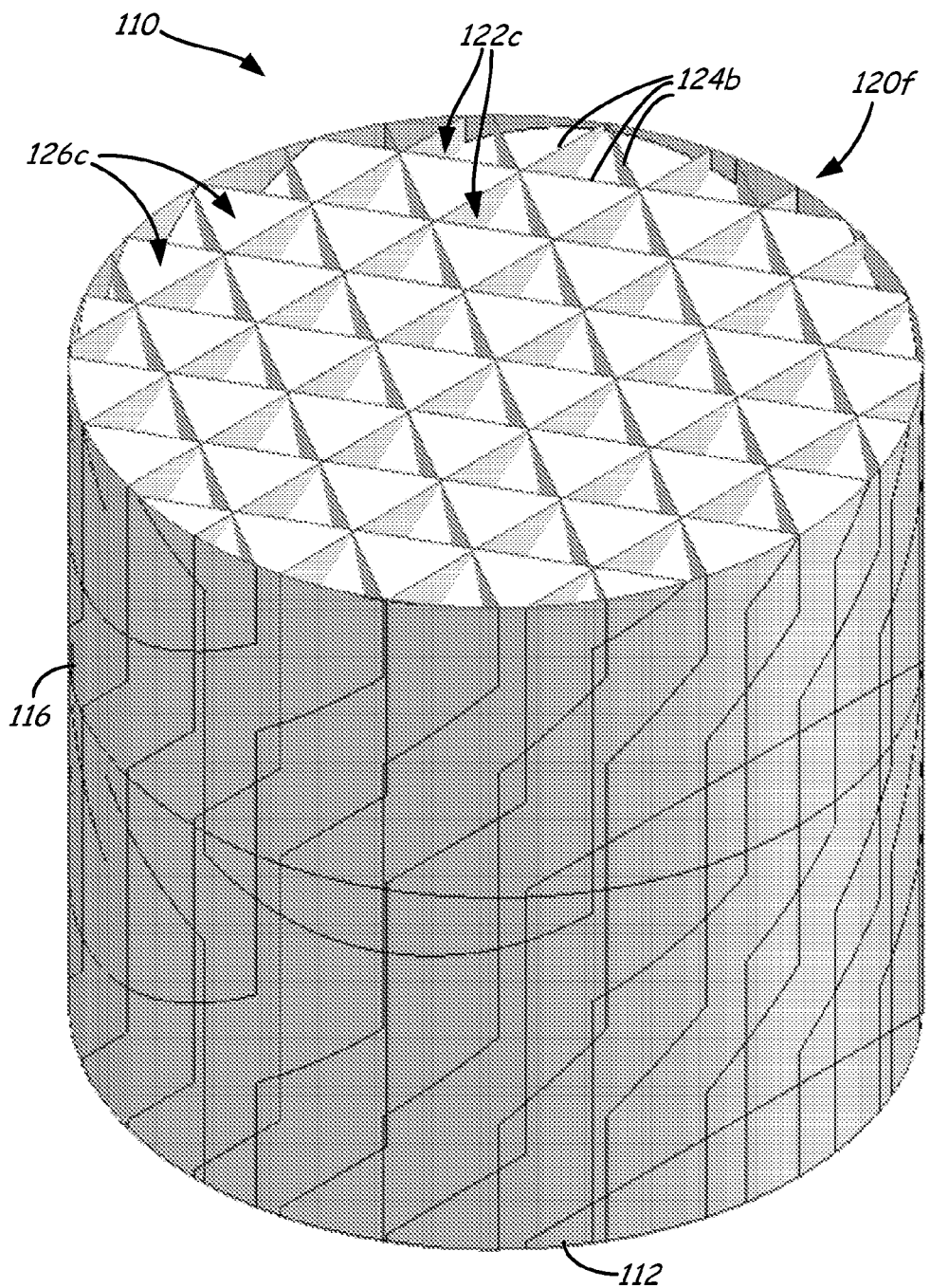
FIG. 32A is an isometric sectional view of section 32A-32A taken in FIG. 31, illustrating internal triangle cell layers of the alternative 3D part.

As shown in FIG. 31, 3D part 110 may include hexagram cells 122a with walls 124a that define hexagon hollow regions 126a and triangular hollow regions 126b, where adjacent hexagram cells 122a share triangular hollow regions 126b. Furthermore, as shown in FIG. 32A, at the adjacent transitions layers 120 of 3D part 110, the transitioning between the hexagram geometries generates intermediary triangular cells 122c half-way through each transition. As shown, triangular cells 122c have walls 124b that define triangular hollow regions 126c.

Figure 32B:
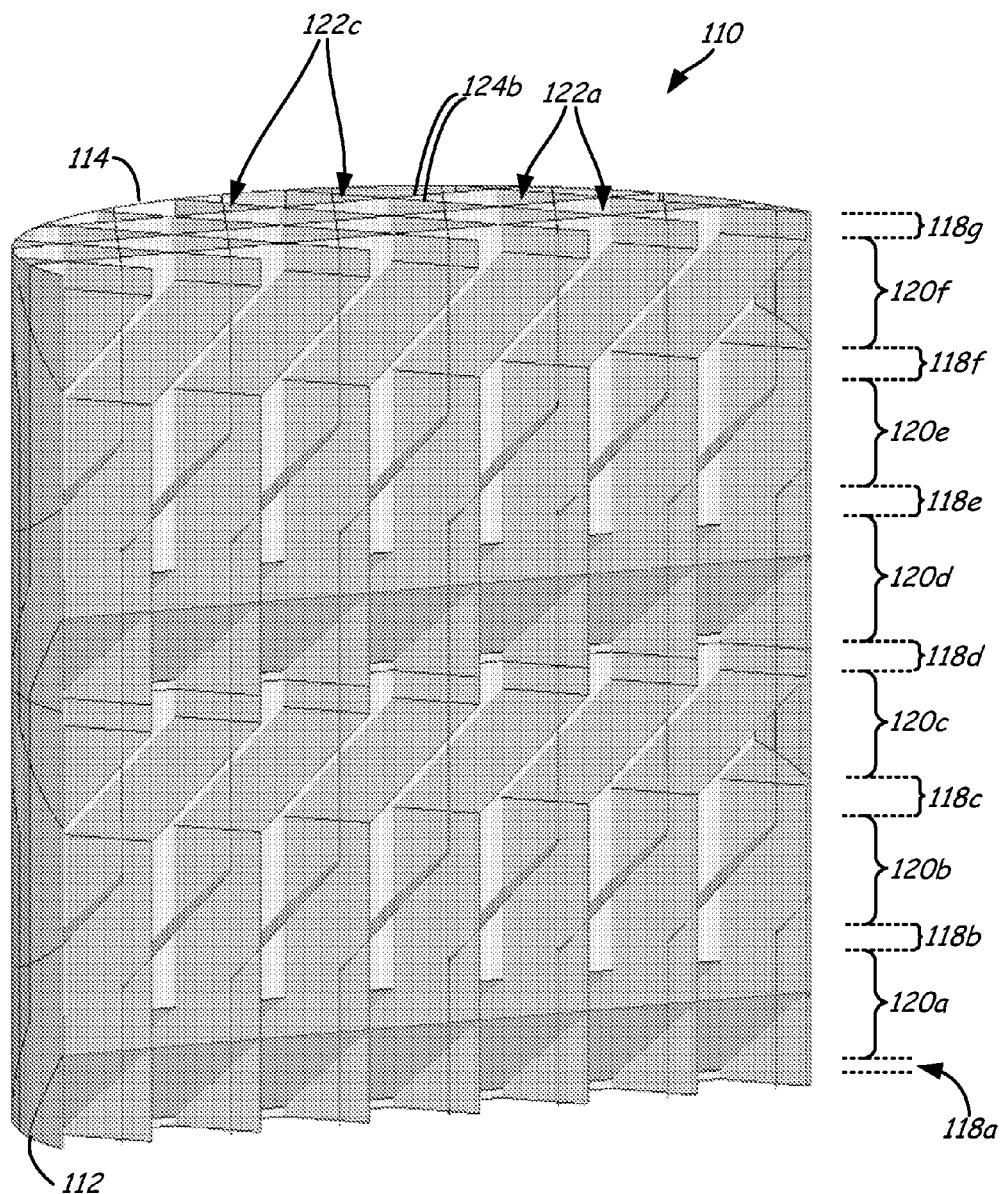
FIG. 32B is an isometric sectional view of section 32B-32B taken in FIG. 31, illustrating internal cell layers and transition layers of the alternative 3D part.
Figure 33:
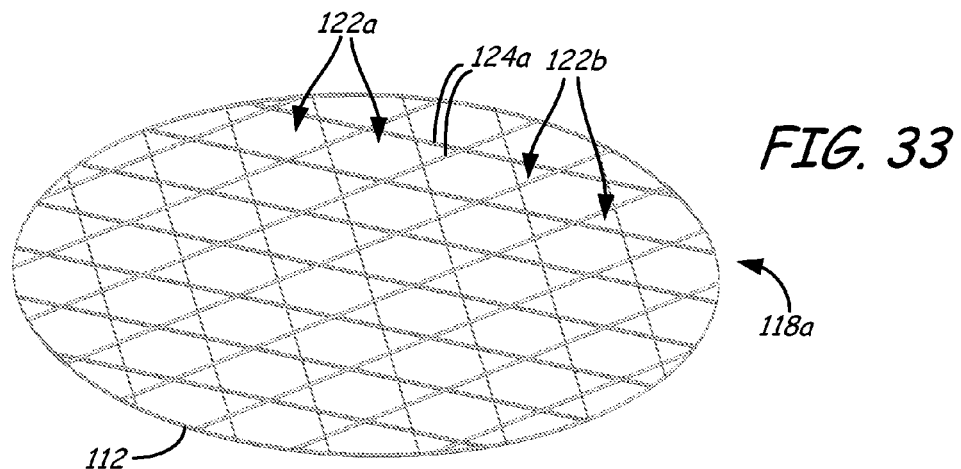
FIGS. 33-49 are isometric views of steps for printing the alternative 3D part of the present disclosure, as depicted in FIGS. 31 and 32.
Figure 34:
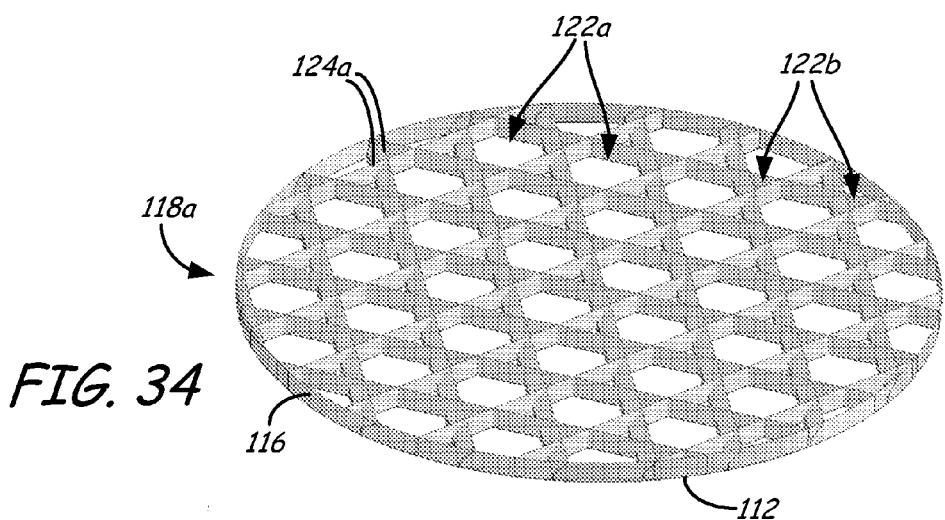
Figure 35:
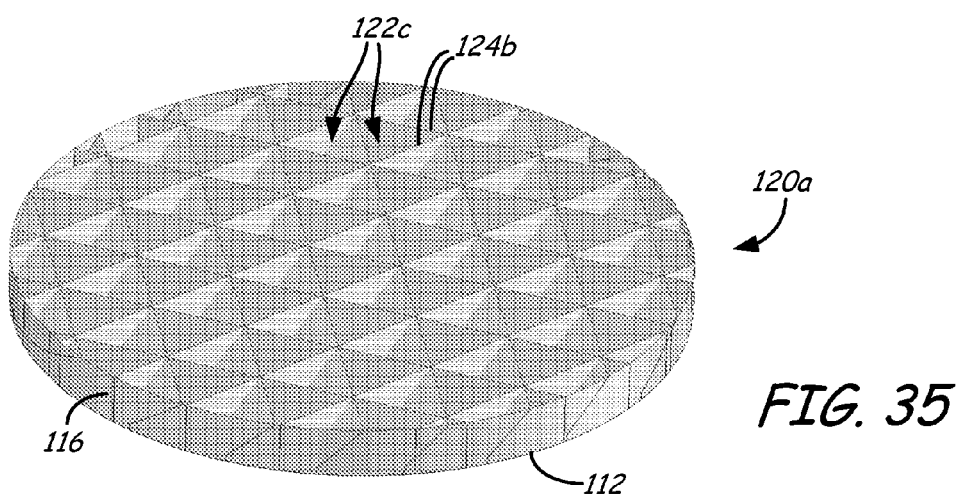
Figure 36:
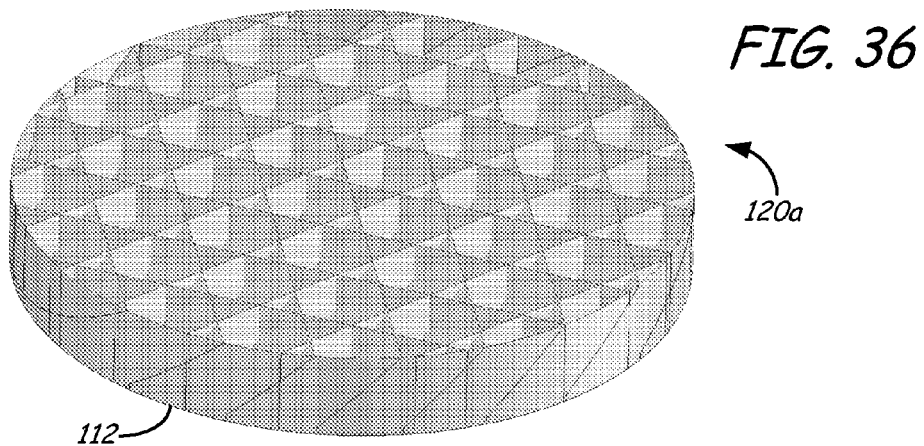
Figure 37:
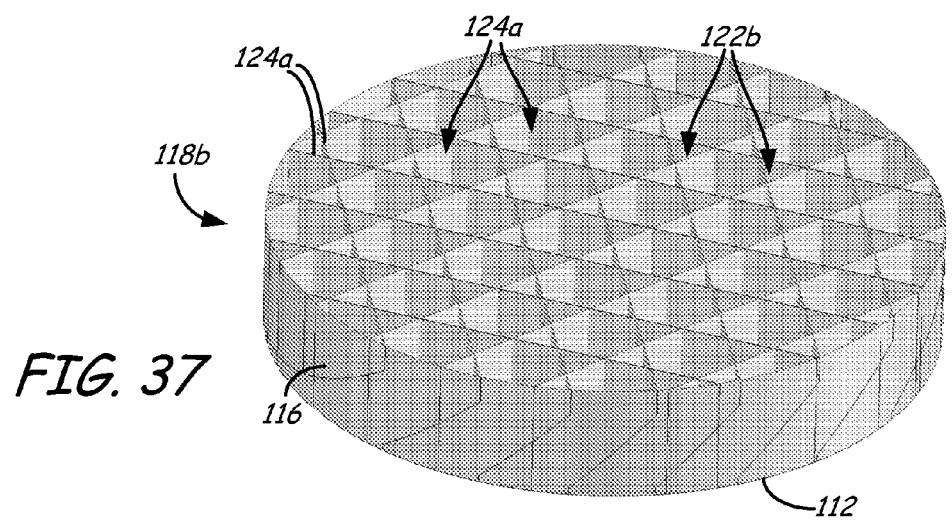
Figure 38:
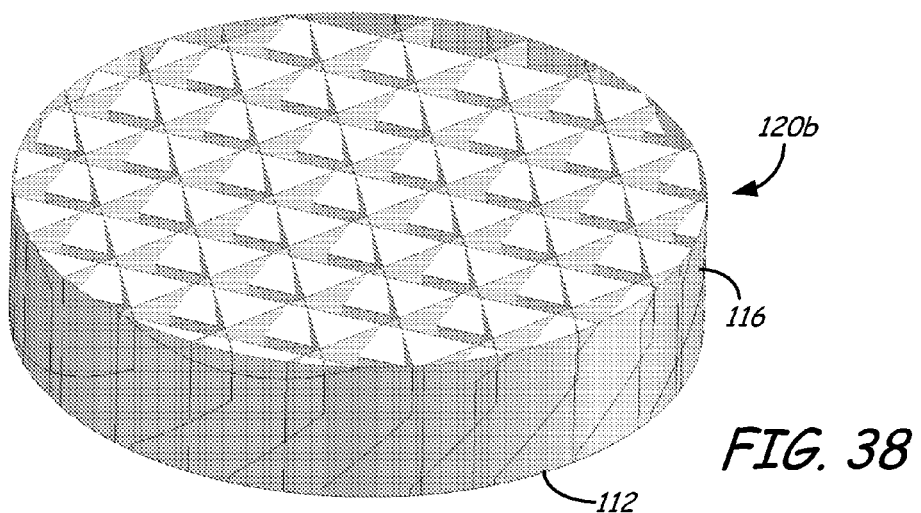
Figure 39:
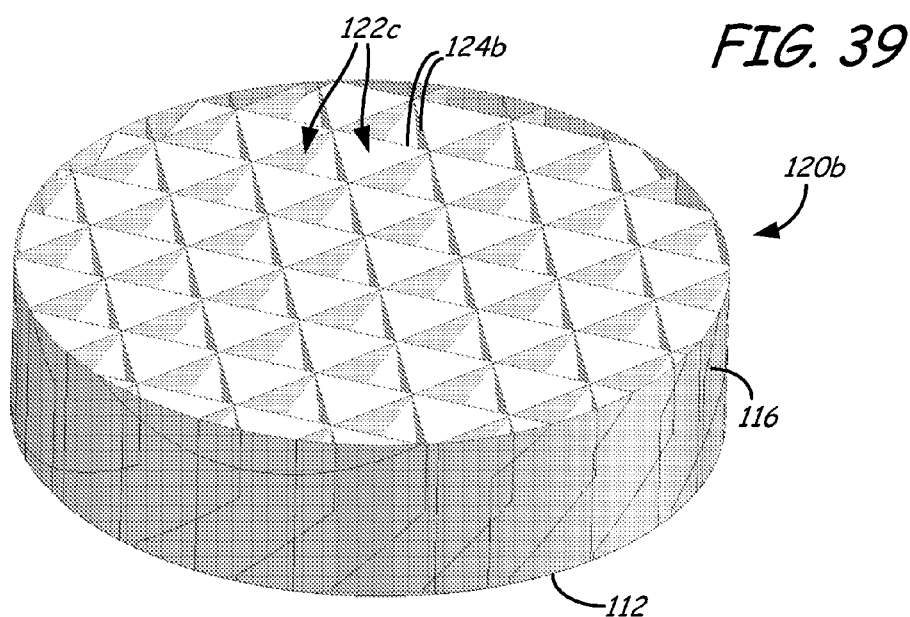
Figure 40:
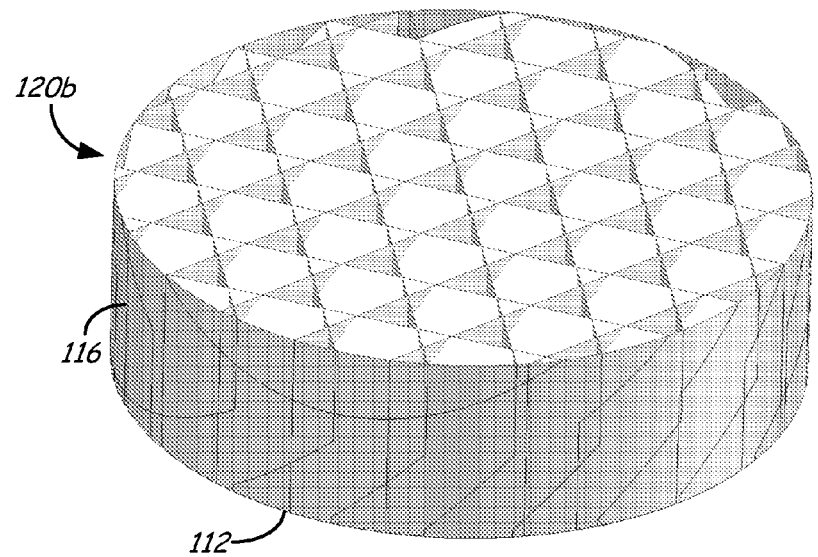
Figure 41:
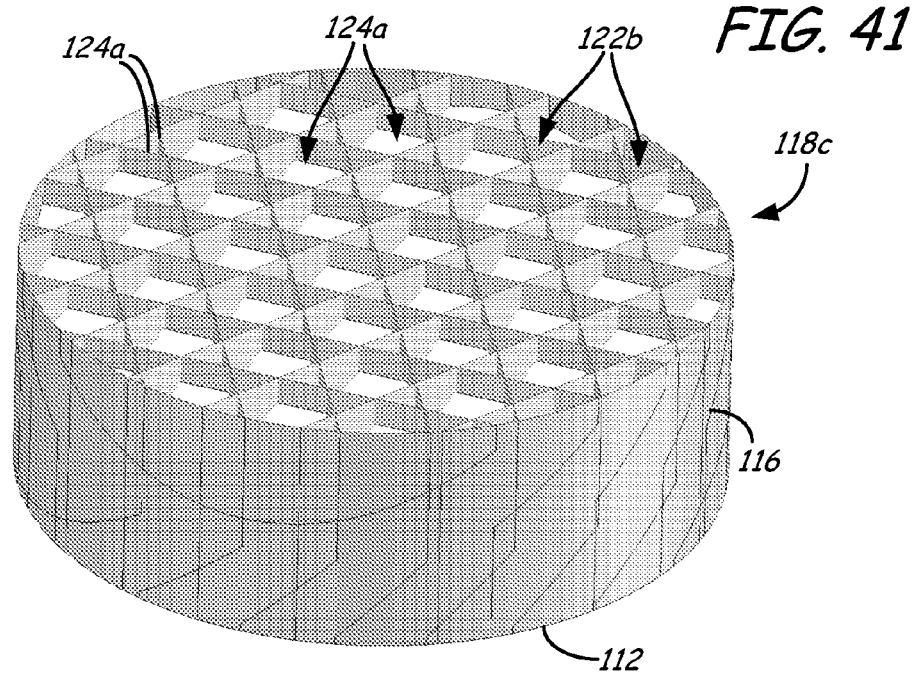
Figure 42:
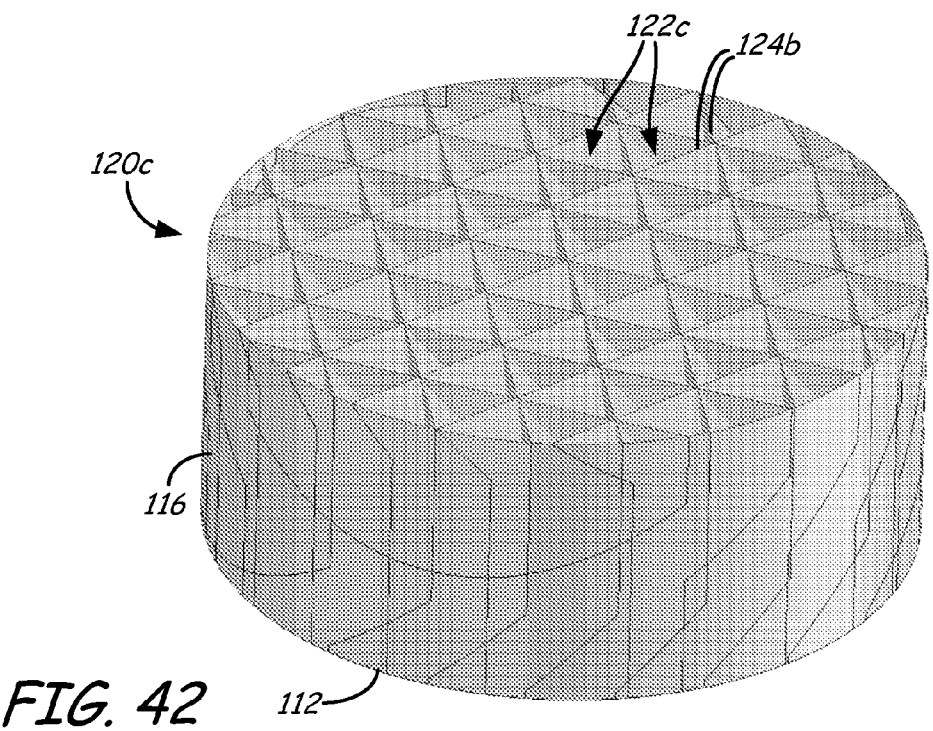
Figure 43:
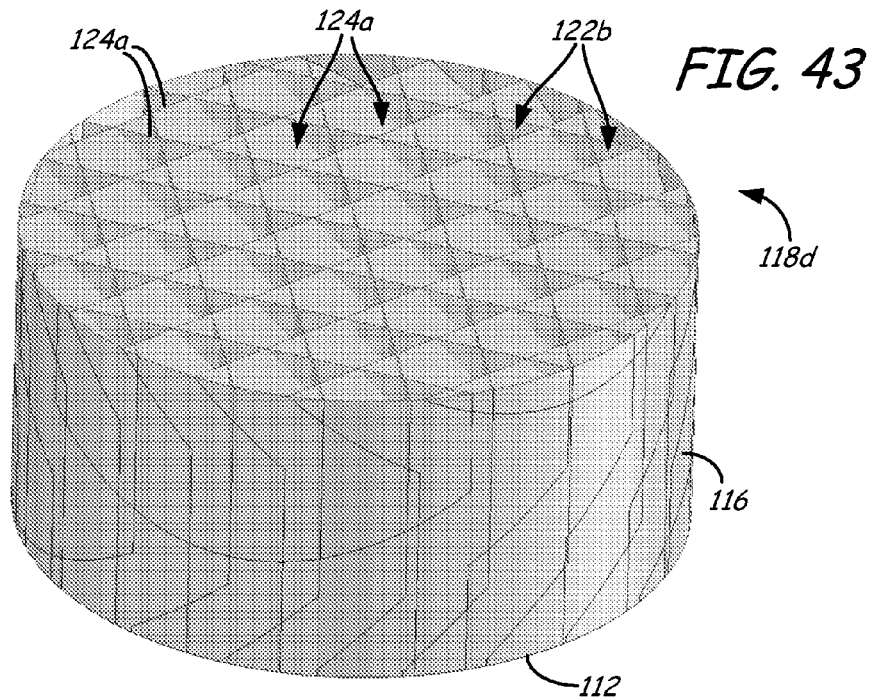
Figure 44:
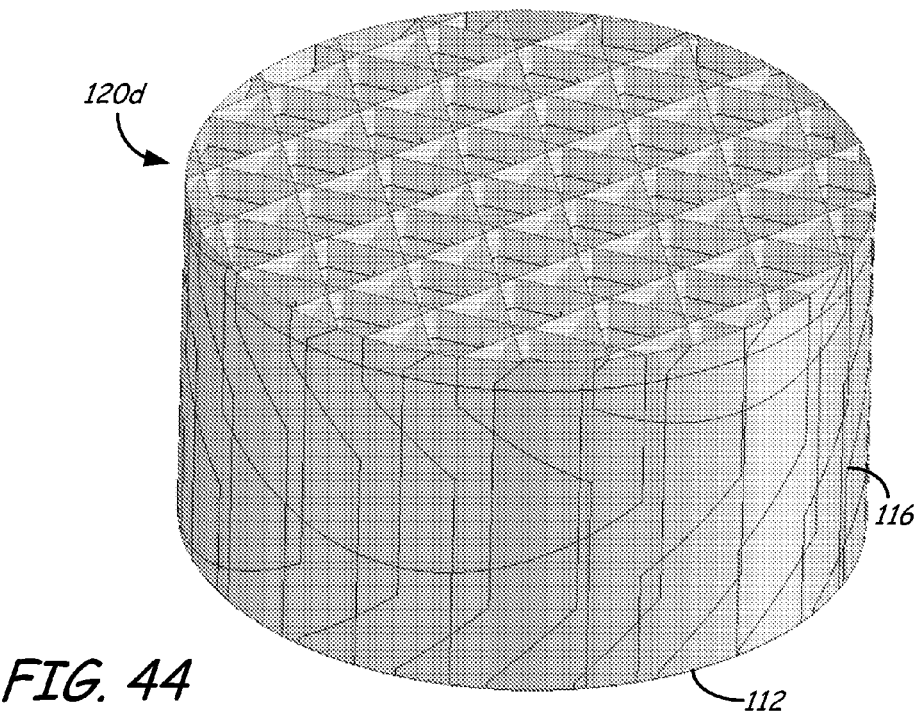
Figure 45:
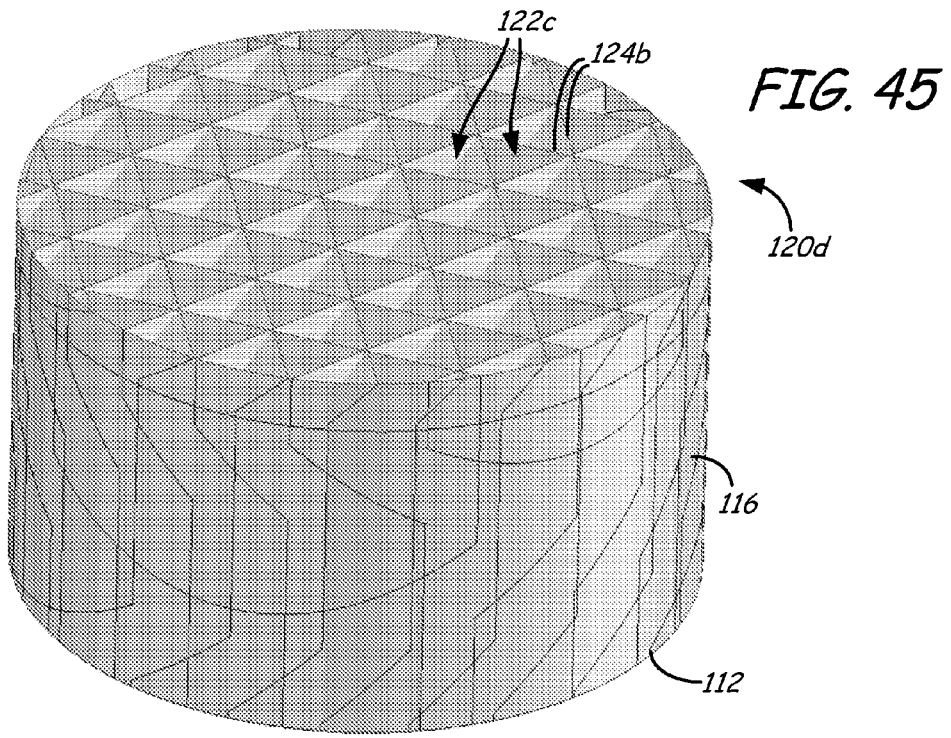
Figure 46:
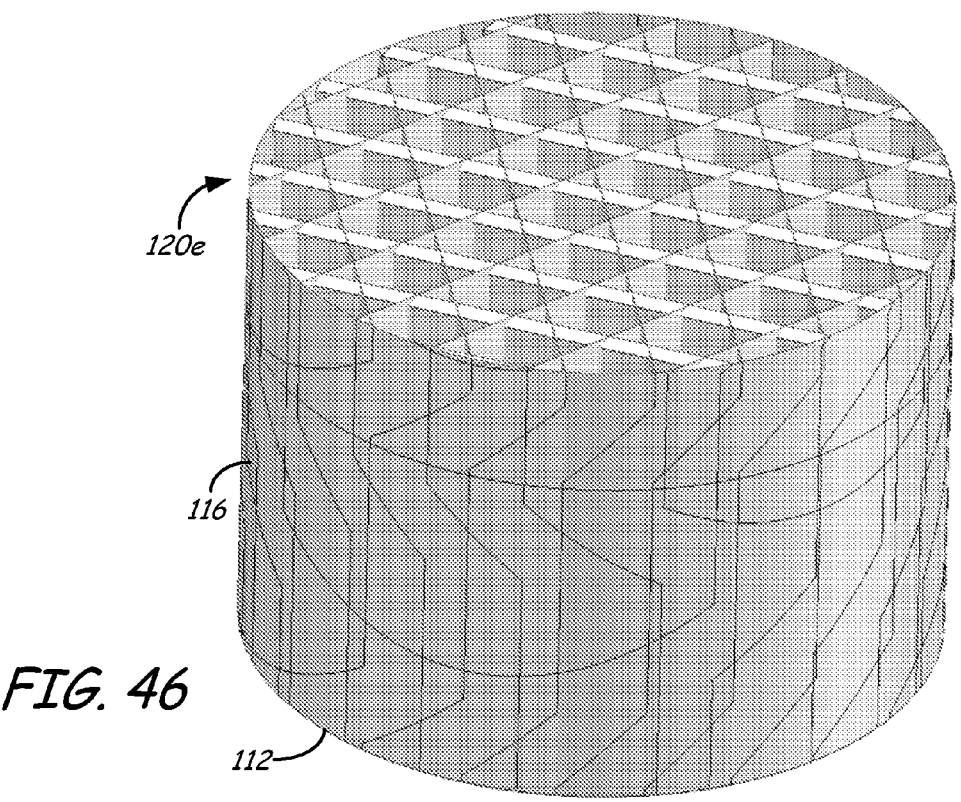
Figure 47:
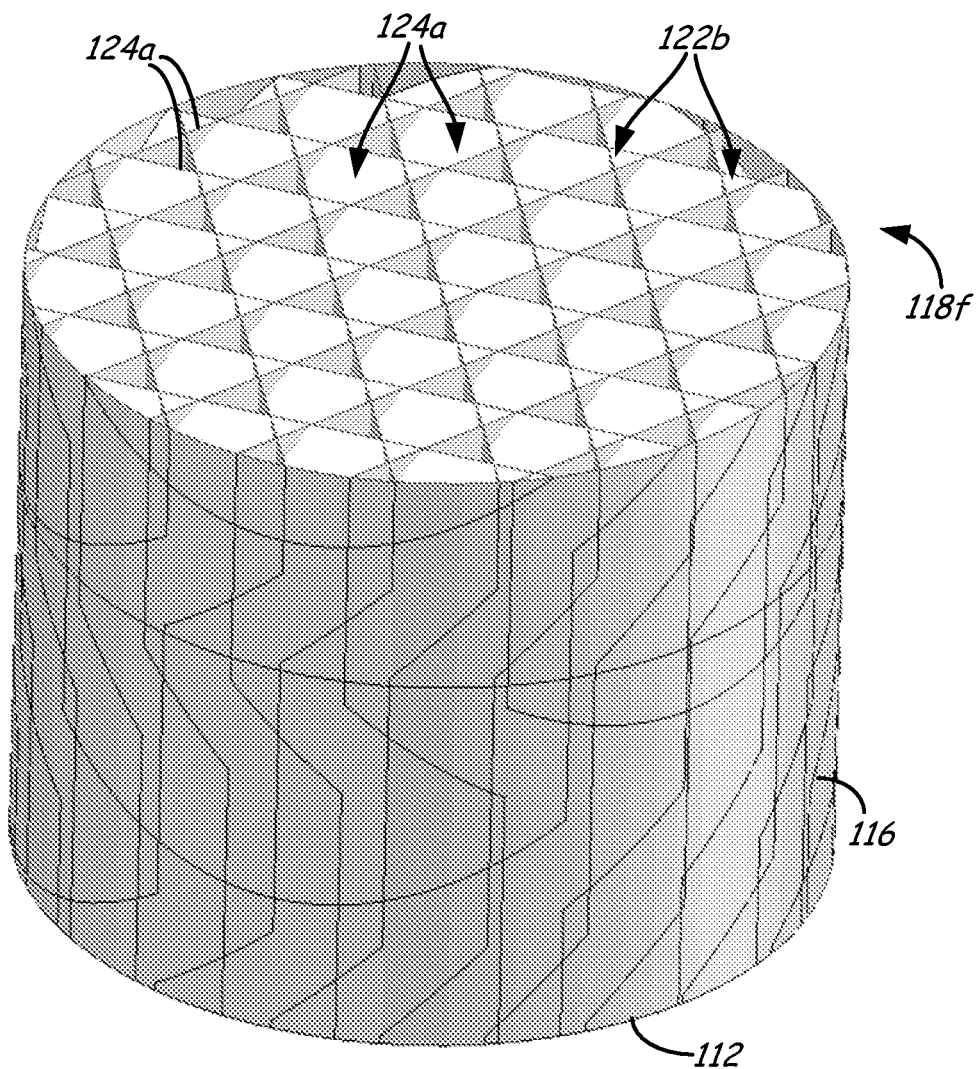
Figure 48:
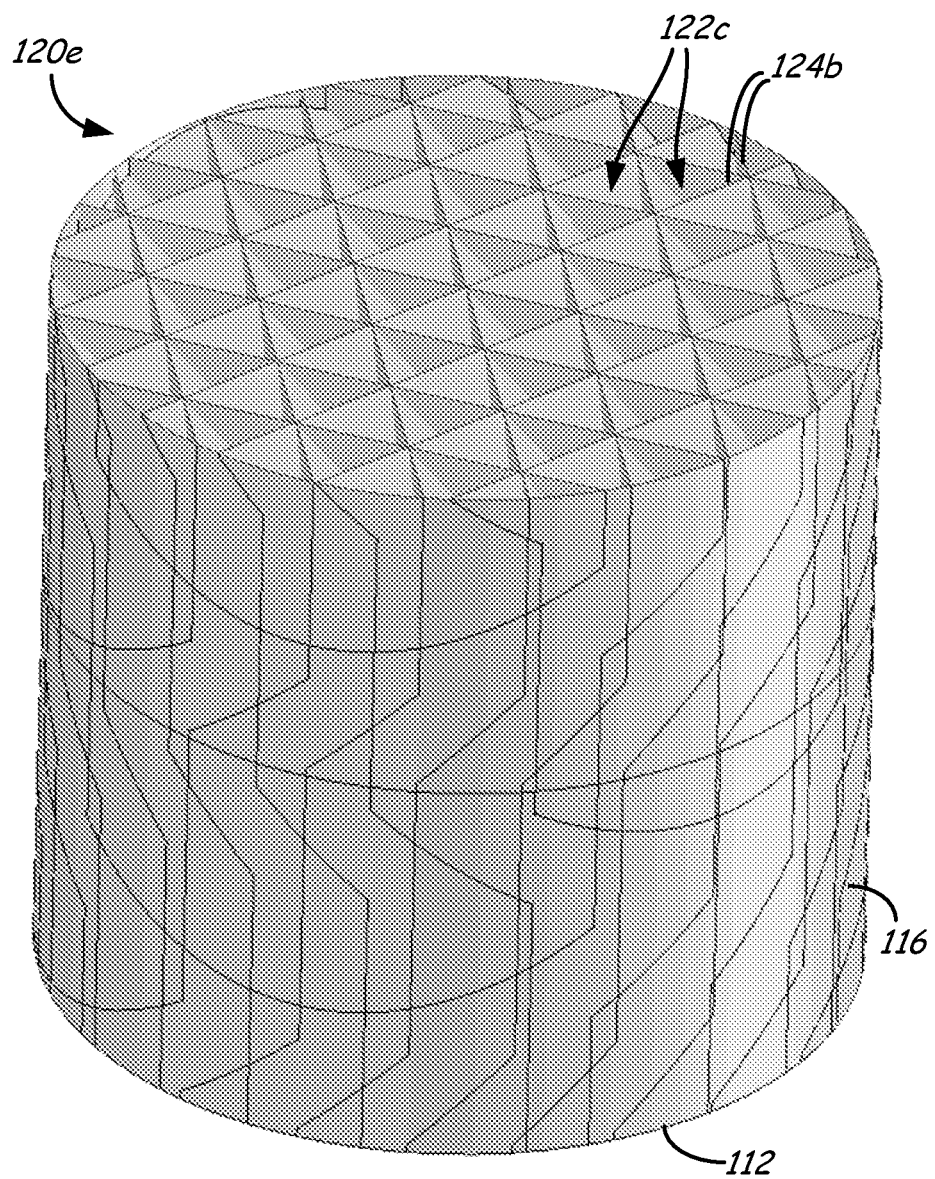
Figure 49:
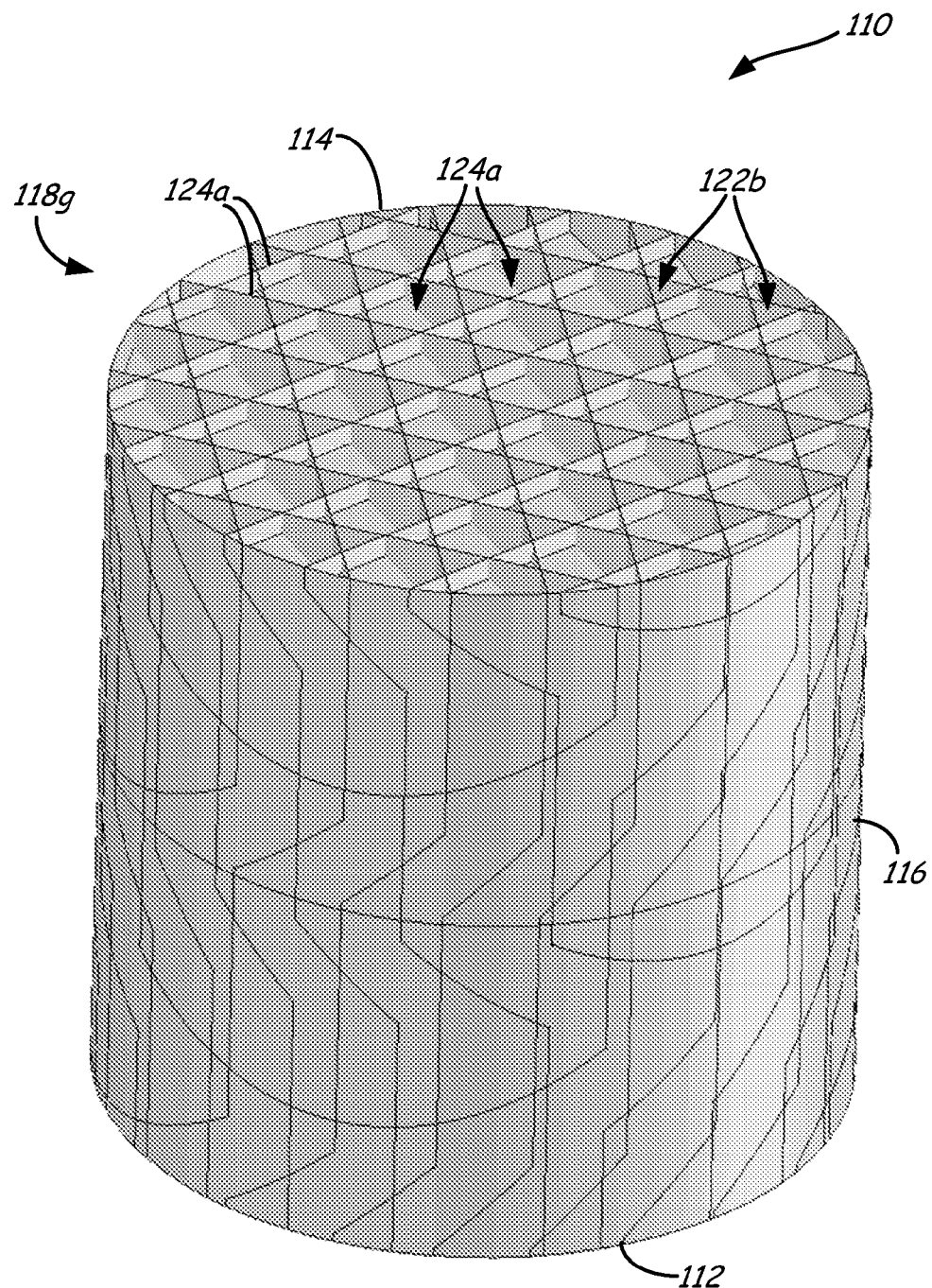

This is further illustrated in FIG. 32B, which shows cell layers 118a-118g alternating between transition layers 120a-120f, and in FIGS. 33-39, which illustrate an application of method 74 for printing 3D part 110 with system 34. Thus, in this embodiment, the transition layers 120a-120f may also include hollow cell geometries that are different from the hexagram geometries of the adjacent cell layers 118a-118g. Nonetheless, as discussed above for 3D part 10, transition layers 120a-120f also preferably interconnect the cell layers 118a-118g such that a fluid may flow into and through multiple hollow cells 122a, 122b, and 122c in the 3D part, more preferably into each hollow cell in the 3D part, regardless of the overall part geometry. In addition, the interconnected hollow pattern, which includes triangular reinforcing geometries, gives the 3D part particularly good strength to reduce the risk of crushing or breaking during use, while also reducing the overall weight of the 3D part.

The 3D parts of the present disclosure (e.g., 3D parts 10 and 110) may be printed using a variety of different part and/or support materials, which may vary depending on the particular additive manufacturing technique and system utilized. In embodiments in which the 3D parts are printed with an extrusion-based additive manufacturing system, examples of suitable materials for printing the 3D parts include those disclosed and listed in Crump et al., U.S. Pat. No. 5,503,785; Lombardi et al., U.S. Pat. Nos. 6,070,107 and 6,228,923; Priedeman et al., U.S. Pat. No. 6,790,403; Comb et al., U.S. Pat. No. 7,122,246; Batchelder, U.S. Patent Application Publication No. 2009/0263582; Hopkins et al., U.S. Patent Application Publication No. 2010/0096072; Batchelder et al., U.S. Patent Application Publication No. 2011/0076496; and Batchelder et al., U.S. Patent Application Publication No. 2011/0076495.

Although the present disclosure has been described with reference to preferred embodiments, workers skilled in the art will recognize that changes may be made in form and detail without departing from the spirit and scope of the disclosure.

The invention claimed is:

1. A three-dimensional part printed using an additive manufacturing technique, the three-dimensional part comprising:
a outer wall having an outer surface and an inner surface wherein the outer wall is printed in a layer by layer manner in a build plane;
a plurality of sets of printed cell layers wherein each of the plurality of sets of printed cell layers are printed such that printed cell layer is attached to the inner surface of the outer wall, each layer defining an array of hollow cells with wall segments; and
a plurality of sets of printed transition layers, each transition layer being printed between and attached to adjacent printed cell layers and attached to the inner surface of the outer wall, wherein the sets of printed transition layers each comprise sloped walls that diverge from a first portion of the wall segments and that converge towards a second portion of the wall segments to interconnect the hollow cells of adjacent printed cell layers in a manner that allows a fluid to flow through a plurality of the hollow cells, and wherein the sloped walls of adjacent printed transition layers have printing orientations that are rotated from each other about an axis substantially perpendicular to the build plane wherein the plurality of sets of printed cell layers, the plurality of sets of printed transition layers and the outer wall form a monolithic construction.

2. The three-dimensional part of claim 1, wherein at least a portion of the hollow cells comprise hollow hexagon geometries.

3. The three-dimensional part of claim 2, wherein the printing orientations are repeated after a predetermined number of sets of printed transition layers.

4. The three-dimensional part of claim 1, wherein the printing orientations that are rotated from each other about the axis of rotation substantially perpendicular to the build plane have rotation angles ranging from about 50 degrees to about 70 degrees.

5. The three-dimensional part of claim 1, wherein the hollow cells of the arrays are substantially aligned in the build plane.

6. The three-dimensional part of claim 1, wherein the sets of printed cell layers and the sets of the transition layers are each printed from a material that is soluble in an aqueous solution.

7. A three-dimensional part printed using an additive manufacturing technique, the three-dimensional part comprising:
an outer wall comprising an outer surface and an inner surface;
a first set of printed cell layers wherein the first set of printed cell layers are attached to the inner surface and wherein the first set of printed cell layers define a first array of hollow cells, wherein at least a first hollow cell of the first array comprises:
a first wall segment; and
a second wall segment that is opposite of the first wall segment across the first hollow cell; and
a first set of printed transition layers that are attached to the inner surface of the outer wall that defines walls comprising:
a third wall segment extending upwardly along a layer-printing direction from the first wall segment; and
a sloped wall extending at an upward angle from the second wall segment, wherein the sloped wall attaches to the third wall segment wherein the first set of printed cell layers, the first set of printed transition layers and the outer wall comprise fused layers of part and/or support materials that form a monolithic construction.

8. The three-dimensional part of claim 7, wherein at least a portion of the hollow cells comprise hollow hexagon geometries.

9. The three-dimensional part of claim 7, and further comprising a second set of printed cell layers defining a second array of hollow cells over the first set of printed transition layers wherein the second set of printed cell layers are attached to the inner surface of the outer wall and to the first printed transition layers.

10. The three-dimensional part of claim 9, wherein the hollow cells of the first array and the hollow cells of the second array are substantially aligned in the build plane.

11. The three-dimensional part of claim 9, and further comprising a second set of printed transition layers that are attached to the second set of printed cell layers and to the inner surface of the outer wall.

12. The three-dimensional part of claim 11, wherein the second set of printed transition layers has a printing orientation rotated about an axis of rotation substantially perpendicular to the build plane such that the second set of printed transition layers is at an angle in the build plane relative to a printing orientation of the first set of printed transition layers.

13. The three-dimensional part of claim 9, wherein the first set of printed cell layers and the first set of the printed transition layers are each printed from a material that is soluble in an aqueous solution.

14. A method for generating and printing a three-dimensional part having an interconnected hollow pattern, the method comprising:
printing an outer wall having an inner surface and an outer surface
printing a first set of cell layers using an additive manufacturing technique such that the first set of cell layers are attached to the inner surface of the outer wall, wherein the first set of printed cell layers defines a first array of hollow cells with wall segments;
printing a first set of transition layers over the first set of printed cell layers using the additive manufacturing technique such that the first set of transition layers are attached to the first set of cell layers and the inner surface of the outer wall, the printing of the first set of transition layers comprises:
printing additional wall segments over first portions of the wall segments of the first array; and
printing sloped walls that diverge from second portions of the abutting wall segments, and that converge towards the printed additional wall segments; and
printing a second set of cell layers over the first set of printed transition layers using the additive manufacturing technique wherein the second set of cell layers is attached to the first set of transition layers and in the inner surface of the outer wall, wherein the second set of printed cell layers defines a second array of hollow cells with wall segments, wherein the first set of printed transition layers interconnects the hollow cells of the first array with the hollow cells of the second array wherein the outer wall, the first set of cell layers, the first set of transition layers and the second set of cell layers are of a monolithic construction.

15. The method of claim 14, wherein at least a portion of the hollow cells comprise hollow hexagon geometries.

16. The method of claim 14, wherein the hollow cells of the first array and the hollow cells of the second array are interconnected in a laterally offset manner.

17. The method of claim 14, and further comprising printing a second set of transition layers over the second set of printed cell layers using the additive manufacturing technique wherein the second set of transition layers are attached to the second set of printed cell layers and the inner surface of the outer wall.

18. The method of claim 17, wherein the second set of printed transition layers has a printing orientation rotated about an axis of rotation substantially perpendicular to the build plane such that the second set of printed transition layers is at an angle in the build plane relative to a printing orientation of the first set of printed transition layers.

19. The method of claim 17, and further comprising printing a third set of cell layers over the second set of printed transition layers using the additive manufacturing technique wherein the third set of cell layers are attached to the second set of transition layers and the inner surface of the outer wall.

20. The method of claim 14, wherein the three-dimensional part is a first three-dimensional part, and wherein the method further comprises:
    receiving a digital model of a second three-dimensional part at a computer;
    generating tool path instructions for the second three-dimensional part with the computer;
    generating tool path instructions for the first three-dimensional part with the computer such that the first three-dimensional part functions as a support structure for the second three-dimensional part; and
    transmitting the generated tool path instructions for the first and second three-dimensional parts to a controller of an additive manufacturing system.

\* \* \* \* \*